(12) United States Patent
Wang et al.

(10) Patent No.: US 12,170,835 B2
(45) Date of Patent: Dec. 17, 2024

(54) SHOOTING METHOD, GRAPHICAL INTERFACE, AND RELATED APPARATUS

(71) Applicant: Honor Device Co., Ltd., Shenzhen (CN)

(72) Inventors: Long Wang, Shenzhen (CN); Jie Yi, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 113 days.

(21) Appl. No.: 18/022,867

(22) PCT Filed: May 13, 2022

(86) PCT No.: PCT/CN2022/092833
§ 371 (c)(1),
(2) Date: Feb. 23, 2023

(87) PCT Pub. No.: WO2022/262497
PCT Pub. Date: Dec. 22, 2022

(65) Prior Publication Data
US 2023/0217098 A1    Jul. 6, 2023

(30) Foreign Application Priority Data
Jun. 16, 2021  (CN) .......................... 202110668288.X

(51) Int. Cl.
*H04N 23/63*     (2023.01)
*G06F 7/498*     (2006.01)
(Continued)

(52) U.S. Cl.
CPC ........... *H04N 23/632* (2023.01); *H04N 23/62* (2023.01); *H04N 23/633* (2023.01); *H04N 23/667* (2023.01)

(58) Field of Classification Search
CPC .. H04N 23/632; H04N 23/633; H04N 23/667; H04N 23/62; H04N 23/617;
(Continued)

(56) References Cited

U.S. PATENT DOCUMENTS

| 7,755,670 | B2 * | 7/2010 | Utagawa | ............... H04N 23/631 348/222.1 |
| 8,630,031 | B1 * | 1/2014 | Keithley | .................. H04N 1/60 358/518 |

(Continued)

FOREIGN PATENT DOCUMENTS

| CN | 104915417 A | 9/2015 |
| CN | 105323456 A | 2/2016 |

(Continued)

OTHER PUBLICATIONS

Xue et al., "Learning and Applying Color Styles From Feature Films," Computer Graphics Forum: Eurographics, vol. 32, No. 7, 10 pages (Nov. 25, 2013).

*Primary Examiner* — Marly S Camargo
(74) *Attorney, Agent, or Firm* — Leydig, Voit & Mayer, Ltd.

(57) ABSTRACT

This application discloses a shooting method, a graphical interface, and a related apparatus. In the method, an electronic device can display a preview interface, and the preview interface is used to display a preview image captured by a camera in real time. The electronic device may include a plurality of look-up table (LUT) templates, and these LUT templates may change a color value of the preview image, so that a display effect of the preview image is similar to or the same as a display effect of a movie, where the display effect may refer to hue, luminance, saturation, and the like. In other words, a shooting mode related to a movie is provided in the method.

14 Claims, 22 Drawing Sheets

User interface 31

(51) Int. Cl.
*G06F 7/505* (2006.01)
*G06F 16/901* (2019.01)
*G06F 17/10* (2006.01)
*H04N 23/617* (2023.01)
*H04N 23/62* (2023.01)
*H04N 23/667* (2023.01)
*H04N 23/741* (2023.01)
*H04N 23/85* (2023.01)

(58) Field of Classification Search
CPC .... H04N 23/741; H04N 23/85; H04N 7/0122; H04N 23/631; H04N 2201/3252; H04N 2201/3256; G11B 7/031; G11B 27/34; G06F 7/4988; G06F 7/5057; G06F 16/9017; G06F 17/10
See application file for complete search history.

(56) References Cited

U.S. PATENT DOCUMENTS

| | | | |
|---|---|---|---|
| 9,204,133 B2 * | 12/2015 | Shigemura | H04N 13/305 |
| 9,942,484 B2 | 4/2018 | Pan et al. | |
| 10,742,893 B2 * | 8/2020 | Kang | H04N 23/63 |
| 11,503,208 B2 | 11/2022 | Song et al. | |
| 12,020,412 B1 * | 6/2024 | He | G06T 5/92 |
| 2018/0270420 A1 | 9/2018 | Lee et al. | |
| 2019/0052790 A1 | 2/2019 | Kang et al. | |
| 2020/0111447 A1 | 4/2020 | Yaacob et al. | |
| 2021/0081093 A1 | 3/2021 | Yun et al. | |
| 2022/0159183 A1 | 5/2022 | Li et al. | |
| 2024/0144451 A1 * | 5/2024 | Xi | G06T 11/00 |

FOREIGN PATENT DOCUMENTS

| | | |
|---|---|---|
| CN | 106254764 A | 12/2016 |
| CN | 109309783 A | 2/2019 |
| CN | 110730299 A | 1/2020 |
| CN | 110798622 A | 2/2020 |
| CN | 111416950 A | 7/2020 |
| CN | 111510698 A | 8/2020 |
| CN | 112153288 A | 12/2020 |
| CN | 112954219 A | 6/2021 |
| CN | 113727017 A | 11/2021 |
| EP | 3764631 A1 | 1/2021 |

* cited by examiner

SHOOTING METHOD, GRAPHICAL INTERFACE, AND RELATED APPARATUS

CROSS-REFERENCE TO RELATED APPLICATIONS

This application is a national stage of International Application No. PCT/CN2022/092833, filed on May 13, 2022, which claims priority to Chinese Patent Application No. 202110668288.X, filed on Jun. 16, 2021. The disclosures of both of the aforementioned applications are hereby incorporated by reference in their entireties.

TECHNICAL FIELD

This application relates to the field of terminal and communication technologies, and in particular, to a shooting method, a graphical interface, and a related apparatus.

BACKGROUND

With the development of an intelligent terminal, a shooting function of the intelligent terminal has become more and more powerful. A user can implement a plurality of powerful functions of camera shooting by using the intelligent terminal, such as a nightscape mode, a portrait mode, and a panoramic mode. However, at the same time, a shooting need of the user is increasing, and how to satisfy the shooting need of the user is a problem that needs to be resolved urgently.

SUMMARY

This application provides a shooting method. In the method, an electronic device may use an LUT template to change a color value of a preview image, so that a display effect of the preview image is similar to or the same as a display effect of a movie. In this way, a user can shoot an image whose tone style is similar to or the same as a tone style of the movie, to make photographing or video recording more interesting and satisfy a shooting need of the user.

According to a first aspect, an embodiment of this application provides a shooting method, and the method is applied to an electronic device including a camera. The method includes: The electronic device displays a preview interface, where the preview interface displays a first image from the camera and a plurality of shooting function options, a color parameter of the first image is a first parameter, and the plurality of shooting function options include an LUT function option; the electronic device receives a first operation for the LUT function option among the plurality of shooting function options, where the LUT function option corresponds to an LUT function, the LUT function provides a plurality of LUT templates, and the plurality of LUT templates are used to change a color parameter of an image; the electronic device determines a target LUT template from the plurality of LUT templates in response to the first operation, where the target LUT template describes a mapping relationship between a second parameter and a third parameter, the second parameter is a color parameter corresponding to a first video, and the third parameter is a color parameter corresponding to a second video; the electronic device adjusts the color parameter of the first image based on the target LUT template, to obtain a second image; the electronic device displays the second image on the preview interface, where a color parameter of the second image is a fourth parameter, and a mapping relationship between the first parameter and the fourth parameter is the same as the mapping relationship between the second parameter and the third parameter; and the electronic device receives a second operation performed on the preview interface, where the electronic device starts shooting for the second image in response to the second operation.

It can be seen that, during shooting, the electronic device may provide the plurality of LUT templates, these LUT templates are related to a display effect of a movie, and these LUT templates may be used to change a display effect of a preview image, so that the display effect of the preview image is the same as or similar to the display effect of the movie, to make the preview image more cinematic. The display effect may refer to hue, luminance, saturation, and the like. In this way, the method can provide a user with a movie-related shooting mode, so that a hue style of an image shot by the electronic device is similar to a tone style of the movie.

With reference to the first aspect, in an implementation, the plurality of LUT templates are stored in the electronic device, and that the electronic device determines the target LUT template from the plurality of LUT templates specifically include: The electronic device determines the target LUT template from the plurality of LUT templates based on luminance, saturation, and picture content of the first image.

That is, the electronic device can intelligently recommend a suitable LUT template based on the preview image, so that the user can easily select the LUT template, and the electronic device can automatically select a most suitable LUT template based on an image obtained by the camera, thereby facilitating an operation of the user and improving user experience.

With reference to the first aspect, in an implementation, after the electronic device determines the target LUT template from the plurality of LUT templates, the method further includes: The electronic device displays prompt information, where the prompt information is used to indicate that a color parameter of an image displayed on the preview interface is adjusted based on the target LUT template.

In other words, after the electronic device automatically selects the suitable LUT template and uses the LUT template to adjust the display effect of the preview image, the electronic device may display the prompt information to indicate the user that the display effect of the preview image has been adjusted based on the LUT template.

With reference to the first aspect, in an implementation, after the electronic device determines the target LUT template from the plurality of LUT templates, the method further includes: The electronic device displays a plurality of template options on the preview interface, where the plurality of template options include a first template option, and the first template option corresponds to the target LUT template.

After receiving an operation performed by the user to enable the LUT function, the electronic device may display, on the preview interface, the plurality of LUT templates provided by the LUT function, so that the user can select a suitable LUT template from the plurality of LUT templates.

With reference to the first aspect, that the electronic device determines the target LUT template from the plurality of LUT templates in response to the first operation specifically includes: The electronic device displays the plurality of template options on the preview interface in response to the first operation, where the plurality of template options correspond to a plurality of templates; the electronic device receives a third operation performed on the first template option among the plurality of template options; and the electronic device determines, in response to the third operation, the target LUT template corresponding to the first template option.

It can be seen that the electronic device can not only automatically select the most suitable LUT template based on the preview image, but also select the LUT template based on the operation of the user, to provide more manners for the user to select the LUT template. In this way, the user can select the LUT template as needed, thereby increasing a degree of freedom in selecting the LUT template.

With reference to the first aspect, in an implementation, after the electronic device displays the plurality of template options on the preview interface in response to the first operation, the method further includes: The electronic device detects a fourth operation for the target LUT template option, where the electronic device displays a video display window in response to the fourth operation, and the video display window is used to display the second video.

In other words, in addition to changing the display effect of the preview image, the LUT template may also display a video clip for the user, and the video clip may be relevant content of the movie. In this way, the LUT template is displayed to the user in a form of a video clip, to make an image adjustment process more interesting, so that the user has a more intuitive understanding of a color effect of the LUT template.

With reference to the first aspect, in an implementation, on the preview interface, sizes of the first image and the second image are preset sizes, and an area other than the first image or the second image is displayed in black.

The electronic device may cut a size of the preview image and add a black edge on the preview interface, so that an aspect ratio of the preview image is an aspect ratio of a movie picture (such as 21:9). In this way, an effect of watching the movie is provided to the user from a visual sense, and a movie atmosphere during shooting is enhanced.

With reference to the first aspect, in an implementation, before the electronic device receives the first operation for the LUT function option among the plurality of shooting function options, the method further includes: The preview interface further displays a plurality of shooting mode options, where the plurality of shooting mode options correspond to a plurality of shooting modes; and that the preview interface displays the first image from the camera and the plurality of shooting function options specifically includes: The preview interface displays the first image from the camera, the electronic device receives an operation performed on the first shooting mode option, and the preview interface displays the plurality of shooting function options in response to the first operation.

In this embodiment of this application, the shooting method may be presented in a shooting process of the electronic device in a shooting mode (a movie mode). When the electronic device enables a camera application, the electronic device may provide a shooting mode interface of the movie mode, and the electronic device may receive a selection operation performed by the user on the mode, to start a photographing process in the mode. In this way, the user can adjust the display effect of the image by using the LUT function in the mode, and experience a fun of shooting the movie.

With reference to the first aspect, in an implementation, after the electronic device receives the operation performed on the first shooting mode option, the method further includes: The electronic device displays the plurality of shooting function options in a landscape orientation.

The first shooting mode option corresponds to the movie mode, and after the electronic device enters the movie mode, all icons can be displayed in a landscape orientation on a user interface displayed by the electronic device, to guide the user to shoot in the landscape orientation, so as to guide the user to better use the movie mode to shoot.

With reference to the first aspect, in an implementation, before the electronic device receives the first operation for the LUT function option among the plurality of shooting function options, the method further includes: The electronic device receives a fifth operation performed on a second shooting function option among the plurality of shooting function options, where in response to the fifth operation, a frame rate of an image captured by the camera is greater than a first value, and a color depth value is greater than a second value.

After the electronic device enters the movie mode, an interface that is used to trigger the user to enable an IMAX function is provided in the movie mode, and the IMAX function may be used to increase color depth of the preview image, so that a color of the image is more delicate and details of the image are more vivid. In addition, in the shooting method, the IMAX function is designed in association with an HDR10 mode, and the HDR10 mode is also enabled after the electronic device enables the IMAX function. The HDR10 mode can provide more dynamic ranges and image details, and can better reflect a visual effect in a real environment, so that the electronic device records a video in a 10-bit high dynamic range. Because if the user needs to obtain a more delicate color image, the user usually needs a clearer image. When the user enables the IMAX function, the HDR10 mode is also enabled synchronously, to facilitate a user's operation and improve user experience.

With reference to the first aspect, in an implementation, the method further includes: The electronic device receives a sixth operation performed on the preview interface, where the sixth operation is used to set a preset duration; and that the electronic device saves the second image as a picture or a video specifically includes: The electronic device saves the second image as a picture or a video after the preset duration.

With reference to the first aspect, in an implementation, before the electronic device saves the second image as a picture or a video, the method further includes: The electronic device displays countdown information on the preview interface.

The movie mode also provides an interface that is used to trigger the user to enable a time-lapse shooting function. In the time-lapse shooting function, the electronic device can display a slate countdown animation during countdown shooting, to make shooting more interesting.

According to a second aspect, an embodiment of this application provides an electronic device, including a display, a camera, a touch sensor, a memory, one or more processors, a plurality of applications, and one or more programs, where the one or more programs are stored in the memory; and when the one or more processors execute the one or more programs, the electronic device is enabled to implement the method according to any one of the first aspect or possible implementations of the first aspect.

According to a third aspect, an embodiment of this application provides a computer program product including an instruction, where when the computer program product runs on an electronic device, the electronic device is enabled to perform the method according to any one of the first aspect or possible implementations of the first aspect.

According to a fourth aspect, an embodiment of this application provides a computer-readable storage medium, including an instruction, where when the instruction is run on an electronic device, the electronic device is enabled to perform the method according to any one of the first aspect or possible implementations of the first aspect.

DESCRIPTION OF EMBODIMENTS

Figure 1:
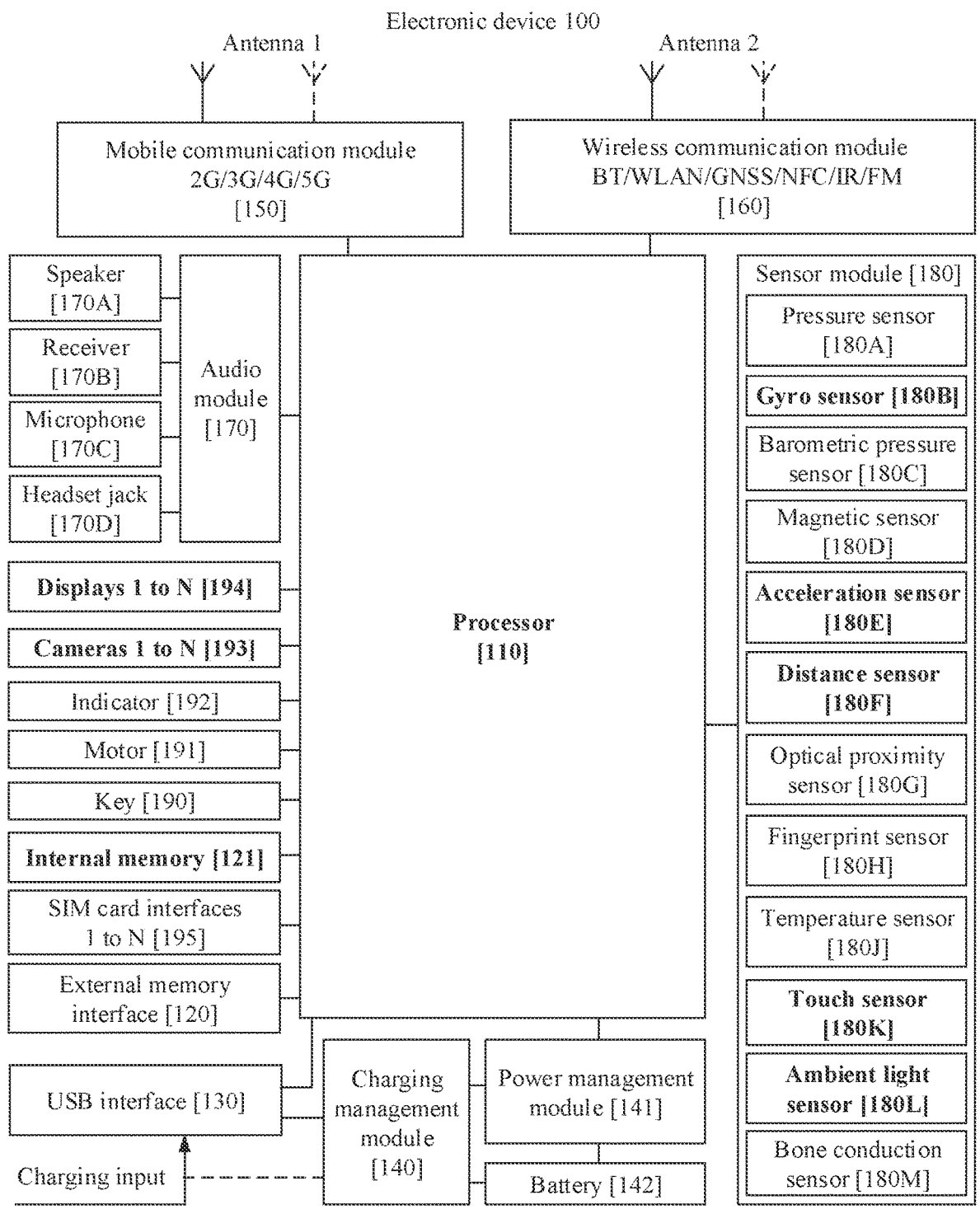
FIG. 1 is a schematic diagram of a hardware structure of an electronic device 100 according to an embodiment of this application.

The following clearly describes technical solutions in embodiments of this application with reference to accompanying drawings in embodiments of this application. In description of embodiments of this application, "I" means "or" unless otherwise specified. For example, A/B may represent A or B. In embodiments of this application, the term "and/or" is only used to describe an association relationship between associated objects, and indicates that three relationships may exist. For example, A and/or B may indicate the following: Only A exists, both A and B exist, and only B exists. In addition, in the description of embodiments of this application, "a plurality of" means two or more.

In the following, the terms "first", and "second" are used for descriptive purposes only, and cannot be construed as indicating or implying relative importance or implicitly indicating a quantity of technical features indicated. Therefore, the features defined with "first", and "second", may explicitly or implicitly include one or more of the features. In the description of embodiments of this application, "a plurality of" means two or more unless otherwise specified.

The term "user interface (UI)" in the following embodiments of this application is a medium interface for interaction and information exchange between an application or an operating system and a user, and implements conversion between an internal form of information and a form that can be accepted by the user. The user interface is source code written in a specific computer language such as Java or an extensible markup language (XML). Interface source code is parsed and rendered on an electronic device, and is finally presented as content that can be identified by the user. The user interface is usually in a representation form of a graphical user interface (GUI), and the graphical user interface is a user interface that is related to a computer operation and that is displayed in a graphical manner. The user interface may be an interface element such as a text, an icon, a button, a menu, a tab, a text box, a dialog box, a status bar, a navigation bar, or a widget displayed on a display of the electronic device.

An embodiment of this application provides a shooting method. The electronic device may display a preview interface, and the preview interface is used to display a preview image captured by a camera in real time. The electronic devices may include a plurality of LUT (LUT) templates, and these LUT templates may be used to change a color value of the preview image, so that a display effect of the preview image is similar to or the same as a display effect of a movie, where the display effect may refer to hue, luminance, saturation, and the like. The electronic device may select an LUT template suitable for the preview image from the plurality of LUT templates based on one or more frames of the preview image captured by the camera, and adjust the display effect of the preview image by using the LUT template, or the electronic device may receive an operation performed by the user, and adjust the display effect of the preview image based on the LUT template selected by the user, to make the preview image displayed on the preview interface more cinematic. In addition, the LUT template may be displayed to the user in a form of a video clip, to make an image adjustment process more interesting, so that the user has a more intuitive understanding of a color effect of the LUT template. In addition, the electronic device may cut a size of the preview image and add a black edge on the preview interface, so that an aspect ratio of the preview image is an aspect ratio of a movie picture (such as 21:9). In this way, an effect of watching the movie is provided to the user from a visual sense, and a movie atmosphere during shooting is enhanced.

The electronic device 100 may display one or more LUT templates after receiving an operation performed by the user to enable the LUT function. The LUT template can provide a color conversion model for converting an image color value, and the color conversion model can specify an output color value based on an input color value. After the LUT template is selected, the electronic device adjusts the color value of the preview image based on the color conversion model in the LUT template, so as to change the display effect of the preview image. An unadjusted image may be an original image captured by the camera, and an adjusted image may be the preview image displayed on the preview interface after the LUT template is added. A color value of the original image is an input color value, and finally on the preview interface, an adjusted color value of the preview image is an output color value.

It may be understood that a name related to the LUT function is not limited in this embodiment of this application, and in another embodiment of this application, the LUT may alternatively be described as an LUT filter, a tone, a palette, or the like. This is not limited in this embodiment of this application.

In general, a shooting mode related to the movie is provided in the shooting method. In the mode, the user can experience a fun of shooting the movie, and a tone style of an image shot by the electronic device is similar to a tone style of the movie, to make photographing or video recording more interesting and satisfy a shooting need of the user.

FIG. 1 shows a schematic diagram of a hardware structure of an electronic device 100.

The electronic device 100 may be a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, a vehicle-mounted device, a smart home device and/or a smart city device. A specific form of the device is not particularly limited in embodiments of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that a structure shown in this application does not constitute a specific limitation on the electronic device 100. In some other embodiments of this application, the electronic device 100 may include more or fewer components than those shown in the figure, or combine some components, or split some components, or have different component arrangements. The illustrated components may be implemented by using hardware, software or a combination of software and hardware.

A processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU), and the like. Different processing units may be independent devices, or may be integrated into one or more processors.

In some embodiments, the processor 110 may be configured to select an LUT template suitable for a preview image from a plurality of LUT templates based on a frame of the preview image captured by a camera, and use the LUT template to change a display effect of the preview image captured by the camera in real time on the preview interface, so that the preview image displayed on the preview interface is more cinematic.

The controller can generate an operation control signal based on instruction operation codes and a timing signal, and complete the control of fetching and executing instructions.

The processor 110 may be further provided with a memory for storing instructions and data. In some embodiments, the memory in the processor 110 is a cache memory. The memory can store an instruction or data that the processor 110 has just used or used cyclically. If the processor 110 needs to use the instruction or data again, the instruction or data can be directly invoked from the memory. Repeated access is avoided, and a waiting time of the processor 110 is reduced, thereby improving system efficiency.

The wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may also be multiplexed to improve antenna utilization. For example, the antenna 1 may be multiplexed into a diversity antenna of a wireless local area network. In some other embodiments, the antenna may be used in combination with a tuning switch.

The mobile communication module 150 can provide a wireless communication solution that is applied to the electronic device 100, including 2G/3G/4G/5G and the like. The mobile communication module 150 may include at least one filter, a switch, a power amplifier, a low noise amplifier (LNA), and the like. The mobile communication module 150 can receive an electromagnetic wave by using the antenna 1, perform processing such as filtering and amplification on the received electromagnetic wave, and transmit a processed electromagnetic wave to the modem processor for demodulation. The mobile communication module 150 may further amplify a signal modulated by the modem processor and convert, by using the antenna 1, the signal into electromagnetic waves for radiation. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to module a to-be-sent low-frequency baseband signal into a medium-high-frequency signal. The demodulator is configured to demodulate a received electromagnetic wave signal into a low-frequency baseband signal. The demodulator then transmits a demodulated low-frequency baseband signal to the baseband processor for processing. After being processed by the baseband processor, the low-frequency baseband signal is transmitted to the application processor. The application processor outputs a sound signal by using an audio device (not limited to the speaker 170A, the receiver 170B, and the like), or displays an image or video by using the display 194. In some embodiments, the modem processor may be an independent device. In some other embodiments, the modem processor may be independent of the processor 110 and disposed in a same device as the mobile communication module 150 or another functional module.

The wireless communication module 160 may provide a wireless communication solution that is applied to the electronic device 100, including wireless local area networks (WLANs) (such as a wireless fidelity (Wi-Fi) network), Bluetooth (BT), global navigation satellite system (GNSS), frequency modulation (FM), near field communication (NFC), infrared (IR), and the like. The wireless communication module 160 may be one or more devices integrating at least one communication processing module. The wireless communication module 160 receives electromagnetic waves by using the antenna 2, performs frequency demodulation and filtering on an electromagnetic wave signal, and sends a processed signal to the processor 110. The wireless communication module 160 can further receive a to-be-sent signal from the processor 110, and perform frequency modulation and amplification on the signal, and the signal is converted into an electromagnetic wave and radiated by the antenna 2.

In some embodiments, the mobile communication template 150 and the wireless communication module 160 may be used to receive an LUT template sent by a server.

In some embodiments, the antenna 1 of the electronic device 100 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, GNSS, WLAN, NFC, FM, an IR technology, and/or the like. The GNSS may include a global positioning system (GPS), a global navigation satellite system (GLONASS), a Beidou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is an image processing microprocessor, which is connected to the display 194 and the application processor. The GPU is configured to perform mathematical and geometric calculations to render graphics. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flex light-emitting diode (FLED), a Miniled, a MicroLed, a Micro-oLed, a quantum dot light emitting diode (QLED), or the like. In some embodiments, the electronic device 100 may include one or N displays 194, where N is a positive integer greater than 1.

In some embodiments, the display 194 may be configured to display a preview interface of the electronic device 100 during shooting, and an image captured by the camera 193 in real time are displayed on the preview interface.

The electronic device 100 can implement a shooting function by using the ISP, the camera 193, the video codec, the GPU, the display 194, the application processor, and the like.

The ISP is configured to process data fed back by the camera 193. For example, during photographing, a shutter is pressed, light is transmitted to a light-sensitive element of the camera through a lens, an optical signal is converted into an electrical signal, and the light-sensitive element of the camera transfers the electrical signal to the ISP for processing, so that the electrical signal is converted into an image visible to a naked eye. The ISP can further optimize algorithms for noise, luminance, and a skin color of the image. The ISP can further optimize parameters such as exposure and a color temperature in a shooting scenario. In some embodiments, the ISP may be disposed in the camera 193.

The camera 193 is configured to capture a still image or a video. An optical image is generated for an object through the lens and is projected to the light-sensitive element. The light-sensitive element may be a charge coupled device (CCD) or a complementary metal-oxide-semiconductor (CMOS) phototransistor. The light-sensitive element converts an optical signal into an electrical signal, and then transfers the electrical signal to the ISP. The ISP converts the electrical signal into a digital image signal. The ISP outputs the digital image signal to the DSP for processing. The DSP converts the digital image signal into an image signal in a standard format of RGB, YUV, or the like. In some embodiments, the electronic device 100 may include one or N cameras 193, where N is a positive integer greater than 1.

The digital signal processor is configured to process a digital signal. In addition to processing a digital image signal, the digital signal processor can further process another digital signal. For example, when the electronic device 100 selects a frequency, the digital signal processor is configured to perform Fourier transform or the like on energy of the frequency.

The video codec is configured to compress or decompress a digital video. The electronic device 100 may support one or more types of video codecs. Therefore, the electronic device 100 may play or record videos in a plurality of encoding formats, such as moving picture experts group (MPEG) 1, MPEG 2, MPEG 3, and MPEG 4.

The NPU is a neural-network (NN) computing processor. By referring to a structure of a biological neural network, such as a transfer mode between human brain neurons, the NPU quickly processes input information, and can further perform continuous self-learning. The NPU can implement applications such as intelligent cognition of the electronic device 100, for example, image recognition, face recognition, voice recognition, and text understanding.

The internal memory 121 may include one or more random access memories (RAMs) and one or more non-volatile memories (NVMs).

In some embodiments, the internal memory 121 may be used to store one or more LUT templates in the electronic device 100.

The random access memory may include a static random-access memory (SRAM), dynamic random access memory (DRAM), a synchronous dynamic random access memory (SDRAM), a double data rate synchronous dynamic random access memory (DDR SDRAM, for example, the fifth DDR SDRAM is usually known as DDR5 SDRAM), and the like. The non-volatile memory may include a magnetic disk storage device, and a flash memory.

The flash memory may fall into types such as NOR FLASH, NAND FLASH, and 3D NAND FLASH, according to a principle of operation; the flash memory may fall into types such as single-level cell (SLC), multi-level cell (MLC), triple-level cell (TLC), and quad-level cell (QLC), based on a potential quantity of a memory cell; and the flash memory may fall into types such as a universal flash storage (UFS) and embedded multimedia Card (eMMC) according to a storage specification.

The random access memory may be directly read and written by the processor 110, and may be configured to store an executable program (for example, a machine instruction) of an operating system or another running program, and may be further configured to store data of a user and data of an application.

The non-volatile memory may store an executable program, data of a user and an application, and the like, and may be loaded into the random access memory in advance for reading and writing directly by the processor 110.

The external memory interface 120 may be configured to connect to an external non-volatile memory, to expand a storage capacity of the electronic device 100. The external non-volatile memory card communicates with the processor 110 by using the external memory interface 120, to implement a data storage function. For example, music, video, and other files are stored in the external non-volatile memory.

The electronic device 100 can implement audio functions (such as music playing and sound recording) by using the audio module 170, the speaker 170A, the receiver 170B, the microphone 170C, the headset jack 170D, the application processor, and the like.

The gyro sensor 180B may be configured to determine a movement posture of the electronic device 100. In some embodiments, the gyro sensor 180B may be configured to determine angular velocities of the electronic device 100 around three axes (that is, x, y, and z axes). The gyro sensor 180B can be used for image stabilization. For example, when the shutter is pressed, the gyro sensor 180B detects a shake angle of the electronic device 100, calculates a distance that a lens module needs to compensate based on the angle, and allows the lens to counteract the shake of the electronic device 100 through reverse movement to implement image stabilization. The gyro sensor 180B can further be used in navigation and somatosensory gaming scenarios.

The acceleration sensor 180E can detect magnitudes of acceleration of the electronic device 100 in various directions (generally three axes). When the electronic device 100 is still, a gravity and a direction may be detected. The acceleration sensor 180E may be further configured to identify the posture of the electronic device, and be used in applications such as switching between a landscape screen and a portrait screen, and a pedometer.

The distance sensor 180F is configured to measure a distance. The electronic device 100 may measure a distance by using infrared or laser. In some embodiments, in a shooting scenario, the electronic device 100 can use the distance sensor 180F to measure a distance to implement quick focusing.

The ambient light sensor 180L is configured to sense luminance of ambient light. The electronic device 100 can adaptively adjust luminance of the display 194 based on the sensed luminance of the ambient light. The ambient light sensor 180L can also be configured to automatically adjust white balance during photographing. The ambient light sensor 180L can further cooperate with the optical proximity sensor 180G to detect whether the electronic device 100 is in a pocket, to prevent accidental touch.

The touch sensor 180K is also referred to as a "touch device". The touch sensor 180K may be disposed on the display 194, and the touch sensor 180K and the display 194 form a touchscreen, which is also referred to as a "touch-controlled screen". The touch sensor 180K is configured to detect a touch operation performed on or near the touch sensor 180K. The touch sensor can transmit a detected touch operation to the application processor to determine a type of a touch event. The display 194 may be configured to provide a visual output related to the touch operation. In some other embodiments, the touch sensor 180K may alternatively be disposed on a surface of the electronic device 100, which is different from the position of the display 194.

The electronic device may be a portable terminal device equipped with iOS, Android, Microsoft, or another operating system such as a mobile phone, a tablet computer, or a wearable device, or may be a non-portable terminal device such as a laptop with a touch-sensitive surface or a touch panel, or a desktop with a touch-sensitive surface or a touch panel. A software system of the electronic device 100 may use a layered architecture, an event-driven architecture, a microkernel architecture, a micro-service architecture, or a cloud architecture. In this application, an Android system with a hierarchical architecture is used as an example to describe a software architecture of an electronic device 100.

Figure 2:
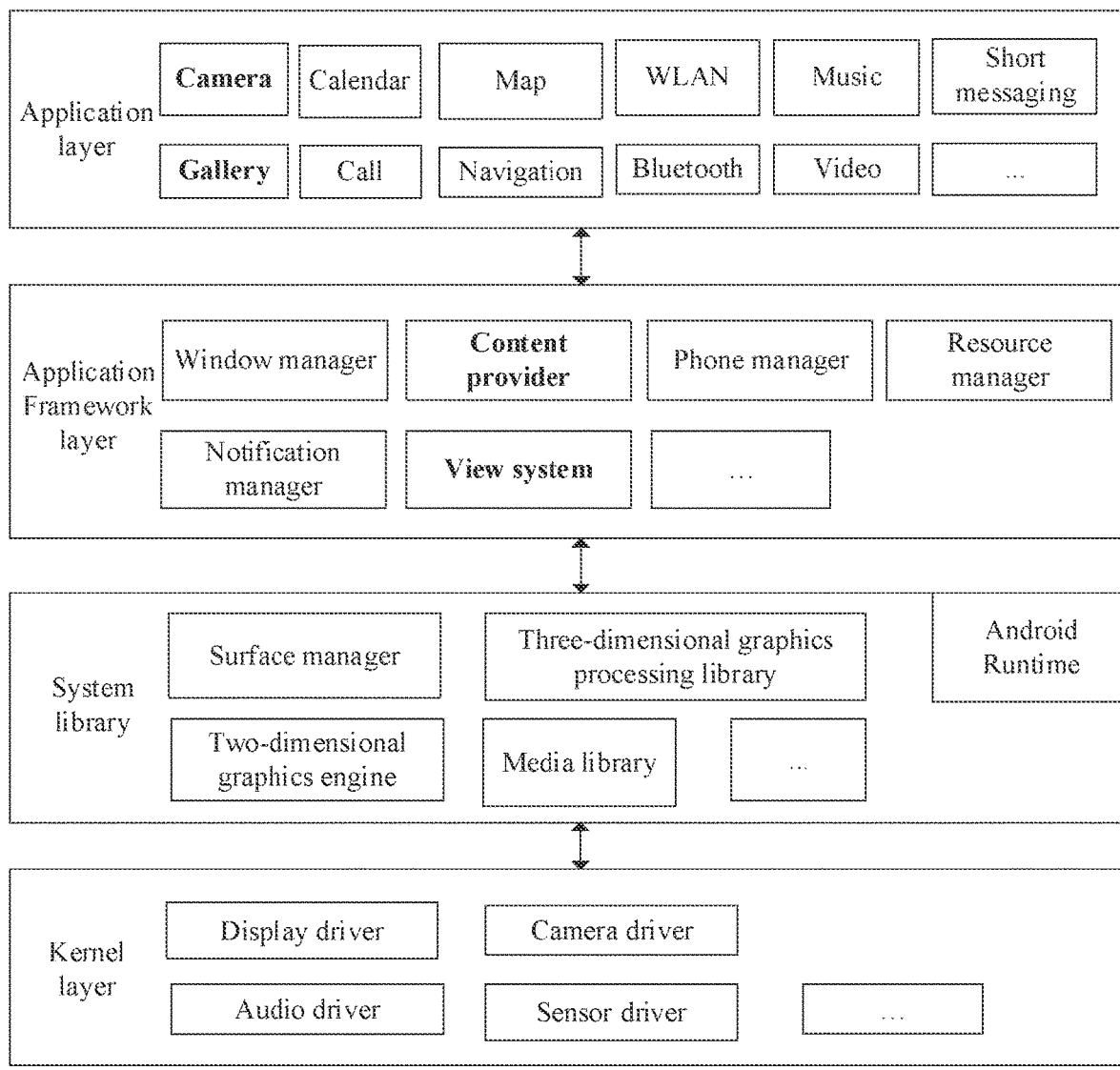
FIG. 2 is a schematic diagram of a software architecture of an electronic device 100 according to an embodiment of this application.

FIG. 2 is a block diagram of a software architecture of the electronic device 100 according to an embodiment of this application.

The layered architecture divides software into several layers, and each layer has a clear function and division of labor. The layers communicate with each other by using a software interface. In some embodiments, the Android system is divided into four layers: an application layer, an application framework layer, an Android runtime and system library layer, and a kernel layer from top down.

The application layer may include a series of application packages.

As shown in FIG. 2, the application packages may include applications such as camera, gallery, calendar, call, map, navigation, WLAN, Bluetooth, music, video, and short messaging service.

The camera may include a plurality of shooting modes, for example, a professional mode, and a movie mode. The professional mode can provide the user with a plurality of adjustable shooting parameters (such as exposure, luminance), and the user can adjust the preview image by adjusting the shooting parameters. The movie mode can provide a shooting mode of a movie theme for the user. For specific description of the professional mode and the movie mode, refer to the following embodiment.

The gallery may be is used to store a picture or a video taken by the electronic device 100 through a camera application, and the electronic device 100 may also adjust a display effect of the picture or video in the gallery by using the LUT template.

The application framework layer provides an application programming interface (API) and a programming framework for applications at the application layer. The application framework layer includes some predefined functions.

As shown in FIG. 2, the application framework layer may include a window manager, a content provider, a view system, a phone manager, a resource manager, notification manager, and the like.

The window manager is used to manage a window program. The window manager may obtain a display size, determine whether there is a status bar, lock a screen, take a screenshot, and the like.

The content provider is used to store and obtain data, and enables these data to be accessible to an application. The data may include videos, images, audio, calls made and received, browsing history and bookmarks, phone books, and the like.

The view system includes visual controls, such as a control for displaying text and a control for displaying pictures. The view system may be used to build an application. The display interface may include one or more views. For example, a display interface that includes a short messaging service notification icon may include a view for displaying text and a view for displaying pictures. The view system can be is used to build a camera application and a gallery application.

The phone manager is used to provide communication functions of an electronic device 100, such as call state management (including connecting, hanging up, or the like).

The resource manager provides resources for applications, such as localized strings, icons, images, layout files, and video files.

The notification manager enables an application to display notification information in the status bar, which can be used to convey a notification-type message, and can automatically disappear after a short stay without user interaction. For example, the notification manager is used for notifying download completion or as a message reminder. The notification manager may alternatively be a notification that appears in the status bar at the top of the system in the form of a chart or scroll bar text, such as a notification for an application running in the background, or a notification that appear on the screen in the form of a dialog window. For example, a text message is displayed in the status bar, a prompt tone is made, an electronic device is vibrating and, an indicator light is flashing.

The Android Runtime includes a core library and a virtual machine. The Android runtime is responsible for scheduling and management of the Android system.

The core library includes two parts: one part is function functions that the java language needs to invoke, and the other part is the core library of Android.

The application layer and the application framework layer run in a virtual machine. The virtual machine executes java files at the application layer and the application framework layer as binary files. The virtual machine is used to implement functions such as object lifecycle management, stack management, thread management, security and exception management, and recycling of waste.

A system library may include a plurality of functional modules, such as a surface manager, media libraries, three-dimensional graphics processing library (for example, OpenGL ES), and a 2D graphics engine (for example, SGL).

The surface manager is used to manage a display subsystem, and provide fusion of 2D and 3D layers for multiple applications.

The media libraries support multiple common audio and video formats for playback and recording, as well as static image files. The media libraries may support a variety of audio and video encoding formats, such as MPEG4, H. 264, MP3, AAC, AMR, JPG, and PNG.

The three-dimensional graphics processing library is used to implement three-dimensional graphics drawing, image rendering, compositing, and layer processing.

The 2D graphics engine is a graphics engine for 2D graphics.

The kernel layer is a layer between hardware and software. The kernel layer includes at least a display driver, a camera driver, an audio driver, and a sensor driver.

The following describes a working process of software and hardware of the electronic device 100 by using an example with reference to a photographing capture scenario.

When the touch sensor 180K receives a touch operation, a corresponding hardware interruption is sent to the kernel layer. The kernel layer processes the touch operation into an original input event (including touch coordinates, a timestamp of the touch operation and other information). The original input event is stored in the kernel layer. The application framework layer obtains the original input event from the kernel layer and recognizes a control corresponding to the input event. In an example in which the touch operation is a tap operation, and the control corresponding to the tap operation is a control of a camera application icon, the camera application invokes the interface of the application framework layer to start the camera application, and then starts the camera driver by invoking the kernel layer. The camera 193 captures a still image or video.

The shooting method provided in this embodiment of this application may be represented as a plurality of functions in two shooting modes, where the two shooting modes may be a movie mode and a professional mode.

The movie mode is a shooting mode related to a movie theme, in the mode, an image displayed by the electronic device 100 can provide a user with a sensory effect of watching a movie, and the electronic device 100 also provides a plurality of LUT templates related to the movie theme. The user can obtain tone-adjusted images or videos by using the LUT templates, and tones of the images or videos are similar to or the same as a tone of the movie. In the following embodiment of this application, the movie mode may provide at least an interface for the user to trigger an LUT function, an IMAX function, and a time-lapse shooting function. For specific description of the LUT function, the IMAX function, and the time-lapse shooting function, refer to the following UI embodiment.

The professional mode is a shooting mode in which the user can adjust shooting parameters. In this mode, the electronic device 100 can provide a plurality of shooting parameters that can be adjusted by the user, including photometry, exposure, luminance, shutter speed, focusing mode, white balance parameters, and the like. The user can adjust these shooting parameters to obtain a desired image display effect. In addition, in this embodiment of this application, the professional mode may further include a plurality of LUT templates similar to the LUT templates in the movie mode, and the user can also obtain a tone-adjusted image or video by using these LUT templates, and tones of the images or videos are similar to or the same as a tone of the movie. In addition, a LOG video can be shot in the professional mode, and an LUT template can be added to the LOG video. In this way, the user can obtain a cinematic image or video, picture content of the image or video can retain more details, and the picture content is more refined and rich. In the following embodiment of this application, the professional mode may at least provide at least an interface for the user to trigger the LUT function and the LOG function. For specific description of the LUT function, and the LOG function, refer to the following UI embodiment.

The following describes some user interfaces according to an embodiment of this application with reference to FIG. 3A to FIG. 3H, FIG. 4A to FIG. 4E, FIG. 5A to FIG. 5G, FIG. 6A to FIG. 6D, and FIG. 7A to FIG. 7H.

FIG. 3A to FIG. 3H show examples of some user interfaces used in the LUT function during photographing.

Figure 3A:
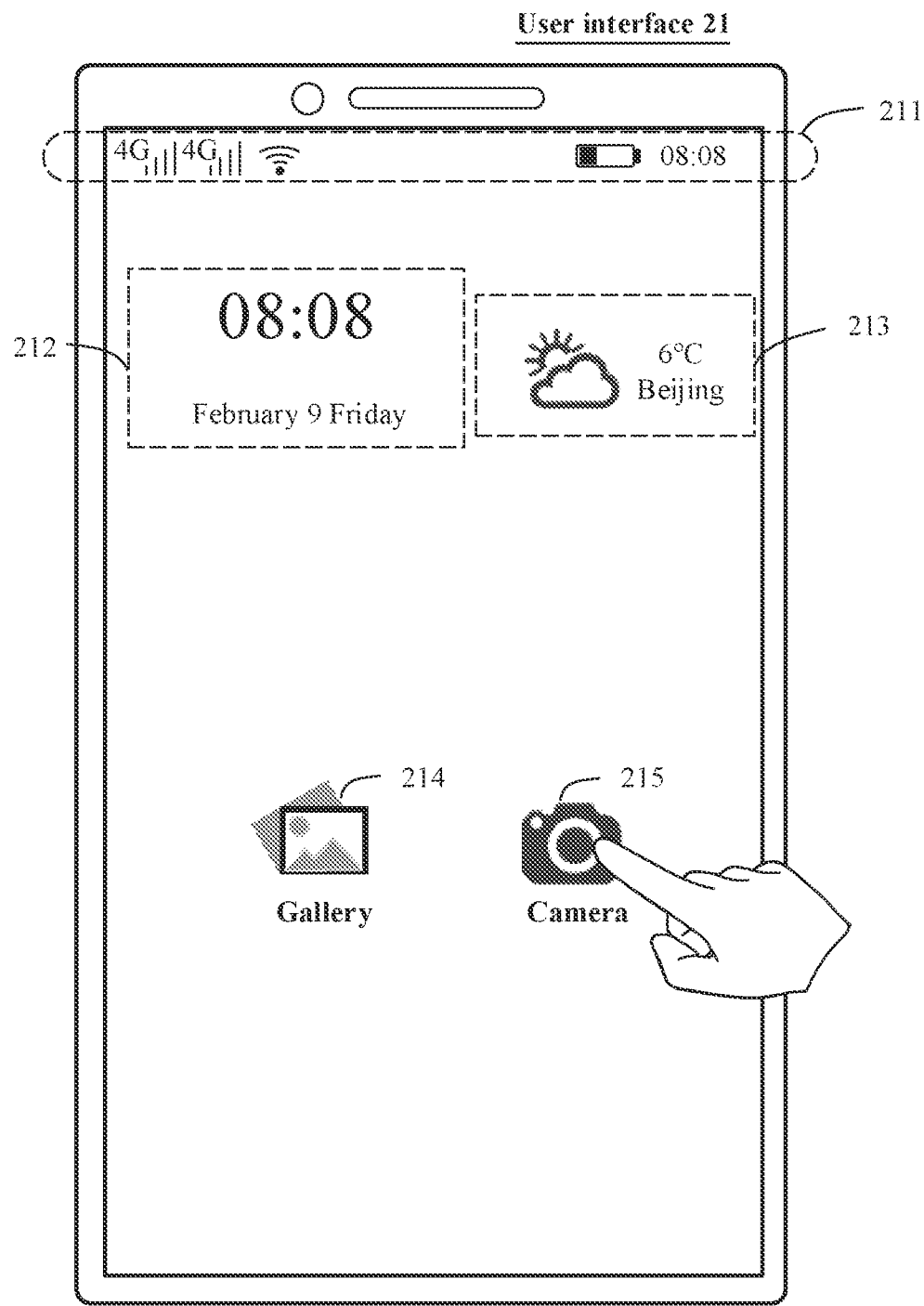
FIG. 3A to FIG. 3H, FIG. 4A to FIG. 4E, FIG. 5A to FIG. 5G, FIG. 6A to FIG. 6D, and FIG. 7A to FIG. 7H are some user interfaces according to an embodiment of this application.

FIG. 3A shows an example user interface 21 that is on the electronic device 100 and that is used for an application menu. The user interface 21 may include: a status bar 211, a calendar indicator 212, a weather indicator 213, a gallery application 214, and a camera application 215.

The status bar 211 may include one or more signal strength indicators of a mobile communication signal, one or more signal strength indicators of a wireless fidelity (WiFi) signal, a battery status indicator, and a time indicator. The calendar indicator 212 may be used to indicate a current time. The weather indicator 213 may be used to indicate a weather type. The gallery application 214 may be used to store a picture shot by the electronic device 100, and the camera application 215 may be used to turn on a camera of the electronic device and provide a user interface to display the image captured by the camera.

In some embodiments, for example, the user interface 21 shown in FIG. 3A may be a home screen.

It may be understood that FIG. 3A merely shows an example of a user interface on the electronic device 100, and should not constitute a limitation on this embodiment of the application.

Figure 3B:
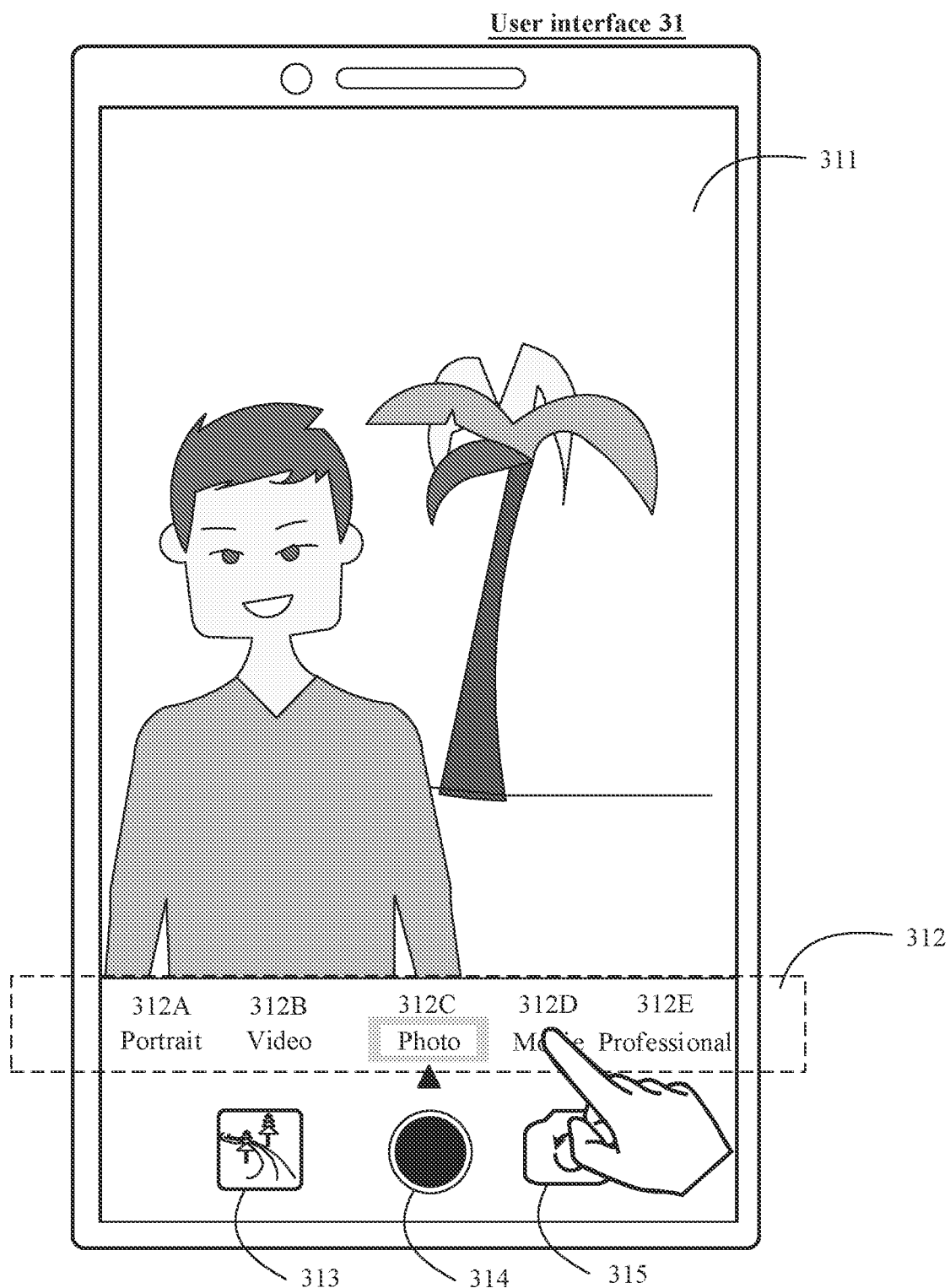

As shown in FIG. 3A, the electronic device 100 may detect a touch operation performed by the user on the camera application 215, and in response to the operation, the electronic device 100 displays a user interface 31 as shown in FIG. 3B. The user interface 31 may be a default photographing interface provided by the application when the electronic device 100 enables the camera application.

As shown in FIG. 3B, the user interface 31 may include: a preview box 311, a shooting mode list 312, a gallery shortcut key 313, a shutter control 314, and a camera flip control 315.

The preview box 311 may be used to display an image captured by the camera 193 in real time. The electronic device 100 may refresh display context therein in real time, so that the user can easily preview the image captured by the camera 193 in real time.

One or more shooting mode options may be displayed in the shooting mode list 312. The one or more shooting mode options may include: a portrait mode option 312A, a video mode option 312B, a photographing mode option 312C, a movie mode option 312D, and a professional option 312E. The one or more shooting mode options may be presented on the interface as text information, for example, "portrait", "video", "photo", "movie", and "professional". In addition, the one or more shooting mode options may also be represented as an icon or another form of interactive element (IE) on the interface.

The gallery shortcut key 313 may be used to enable the gallery application. In response to an operation performed by the user on the gallery shortcut key 313, such as a tap operation, the electronic device 100 may enable the gallery application. In this way, the user can easily view photos and videos taken, and there is no need to exit the camera application before enabling the gallery application. The gallery application is an application for picture management on an electronic device such as a smartphone or a tablet computer, and may also be referred to as an "album". A name of the application is not limited in this embodiment. The gallery application may support the user to perform various operations on a picture stored in the electronic device 100, for example, operations such as browsing, editing, deletion, and selection.

The shutter control 314 may be used to monitor an operation performed by the user to trigger photographing. The electronic device 100 may detect an operation performed by the user on the shutter control 314, and in response to the operation, the electronic device 100 may save an image in the preview box 311 as a picture in the gallery application. In addition, the electronic device 100 may also display a thumbnail of the saved image in the gallery shortcut key 313. In other words, the user can tap the shutter control 314 to trigger photographing. The shutter control 314 may be a button or another form of control.

The camera flip control 315 may be used to monitor an operation performed by the user to trigger flipping of a camera. The electronic device 100 may detect an operation performed by the user on the camera flip control 315, such as a tap operation, and in response to the operation, the electronic device 100 may flip the camera, for example, switch from a rear camera to a front camera.

Figure 3C:
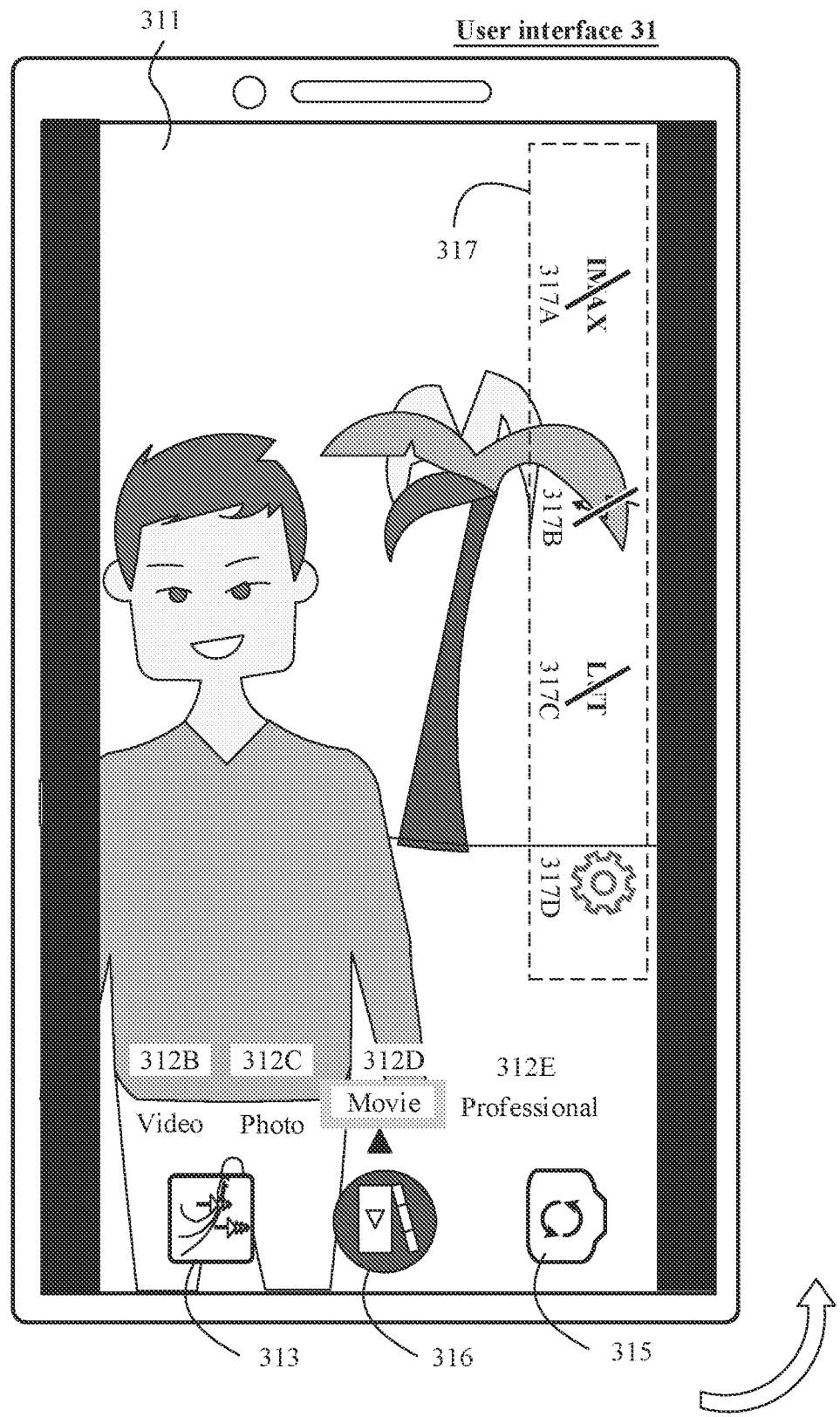

As shown in FIG. 3B, the electronic device 100 may detect a touch operation performed by the user on the movie mode option 312D, and in response to the operation, the electronic device displays the user interface 31 as shown in FIG. 3C.

In some embodiments, the electronic device 100 may enable the movie mode by default after enabling the camera application. In addition, the electronic device 100 may also enable the movie mode in another way, for example, the electronic device 100 may also enable the movie mode based on a voice instruction of the user. This is not limited in this embodiment of this application.

As shown in FIG. 3C, the preview interface 311 includes a function option 317, and the function option 317 includes an IMAX option 317A, a flash option 317B, an LUT option 317C, and a setting option 317D. Each of the function options may be used to detect a touch operation of the user, and in response to the operation, a corresponding shooting function is enabled or disabled, for example, an IMAX function, a flash function, an LUT function, and a setting function. The flash function may be used to monitor an operation performed by the user to trigger a flash, and the setting function may be used to open a shooting setting interface. For specific description of the IMAX function and the LUT function, refer to the following embodiment, and details are not described herein. In addition, the shutter control 314 is updated to be a movie shutter control 316, and is similar to the shutter control 314. The movie shutter control 316 may be used to monitor an operation performed by the user to trigger video recording. The electronic device 100 may detect an operation performed again by the user on the movie shutter control 316, and in response to the operation, the electronic device 100 starts video recording. When the electronic device 100 detects performed by the user on the movie shutter control 316, the electronic device 100 stops video recording, and saves an image displayed between a last operation performed by the user on the movie shutter control 316 and a current operation performed by the user on the movie shutter control 316, on the preview interface 311 as a video. Further, as shown in FIG. 3C, black edges are added to left and right boundaries of the preview interface 311, so that a size of the image captured by the camera displayed on the preview interface 311 is the same as a size of a movie picture. In this way, an atmosphere of shooting a movie can be enhanced. In addition, when the electronic device 100 performs displaying in a portrait orientation, icons displayed on user interfaces, for example, the gallery shortcut key 313, the camera flip control 315, the movie shutter control 316, and the function option 317 are displayed in a landscape orientation. The plurality of icons displayed in the landscape orientation may guide the user to hold the electronic device 100 in a landscape orientation for shooting. When it is detected that the user rotates the electronic device 100 in the landscape orientation, the electronic device 100 displays the user interface 31 as shown in FIG. 3D.

Figure 3D:
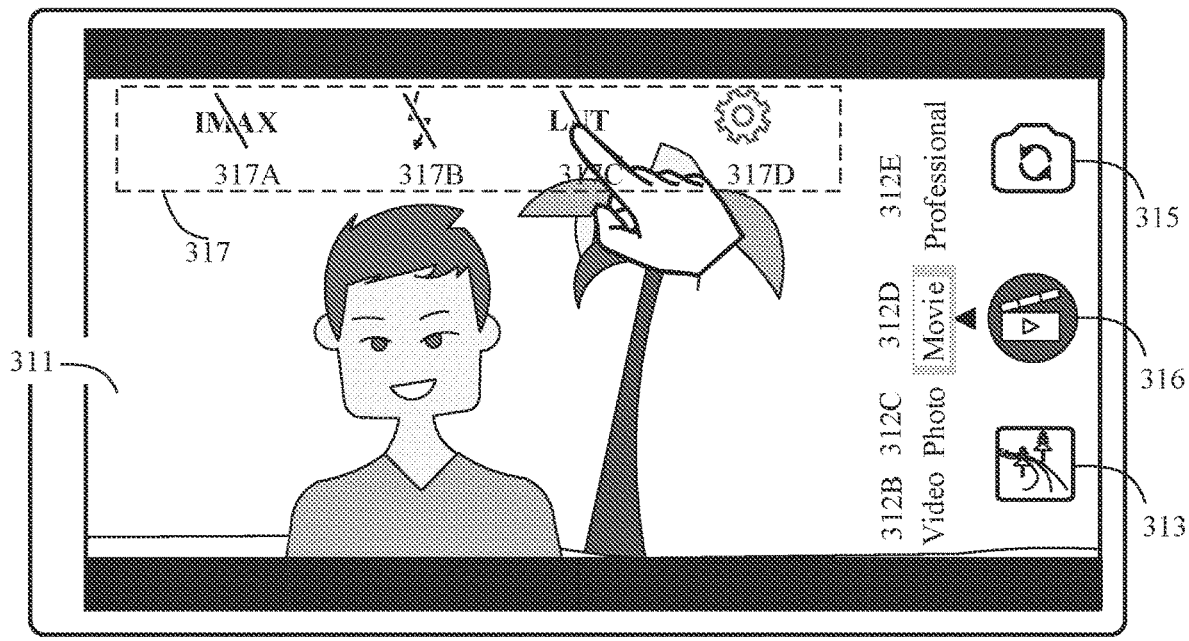

As shown in FIG. 3D, a direction in which icons such as the gallery shortcut key 313, the camera flip control 315, the movie shutter control 316, and the function option 317 are displayed is the same as a direction in which the icons are displayed when the electronic device 100 is placed in the landscape orientation. The electronic device 100 may detect a touch operation performed by the user on the LUT option 317C, and in response to the operation, the electronic device 100 displays the user interface 31 as shown in FIG. 3E.

Figure 3E:
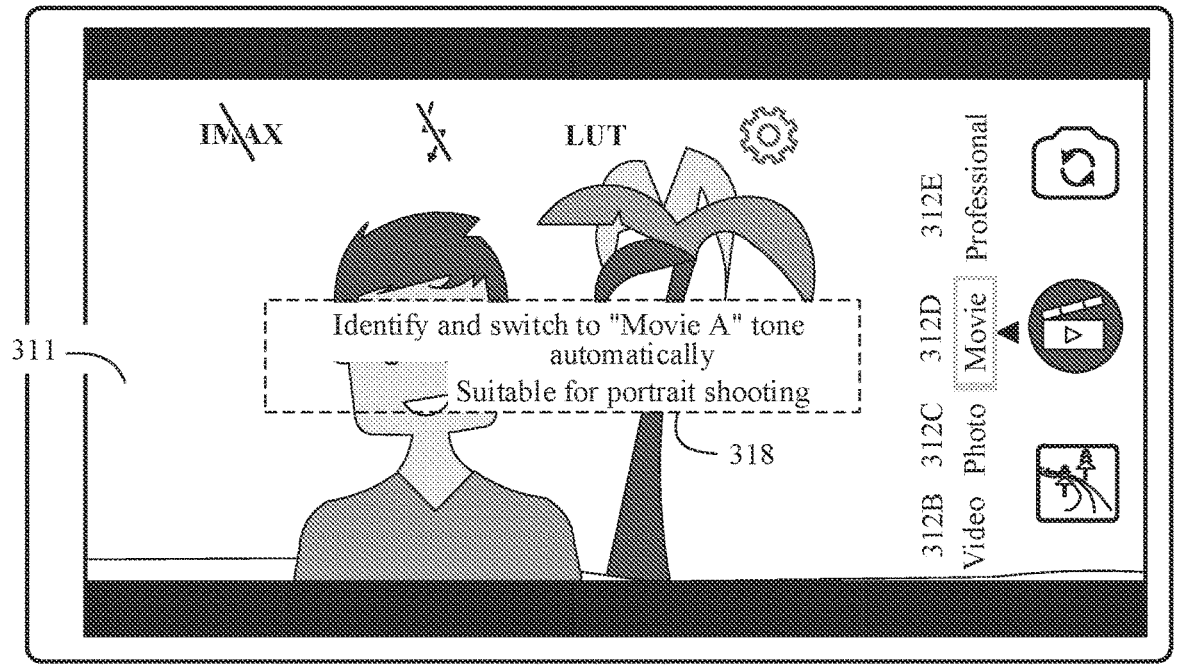

As shown in FIG. 3E, the electronic device 100 enables the LUT function, and the LUT function may be used to change the display effect of the preview image. Essentially, the LUT function introduces a color lookup table, the color lookup table is equivalent to a color conversion model, and the color conversion model can output an adjusted color value based on an input color value. A color value of an image captured by the camera is equivalent to the input value, and for different color values, corresponding output values may be obtained after the image is adjusted by using the color conversion model. Finally, the image displayed in the preview box 311 is an image adjusted by using the color conversion model. The electronic device 100 uses the LUT function to display an image including color values adjusted by using the color conversion model, to achieve an effect of adjusting a tone of the image. After enabling the LUT function, the electronic device 100 may provide a plurality of LUT templates, an LUT template corresponds to a color conversion model, and different LUT templates may bring different display effects to the preview image. In addition, these LUT templates may be associated with a movie theme, and a tone adjustment effect that the LUT template brings to the preview image may be close to or the same as a tone in the movie, to create an atmosphere of shooting the movie for the user.

In addition, after enabling the LUT function, the electronic device 100 may intelligently recommend a suitable LUT template based on the image displayed in the preview box 311, and display prompt information 318 as shown in FIG. 3E. The prompt information 318 is used to prompt the user that the electronic device 100 has added a suitable LUT template for the preview image displayed in the preview box 311, specifically, a name of the LUT template is "movie A". In comparison with a visible portion of the preview image in FIG. 3D and FIG. 3E, it can be seen that the enabling of the LUT function changes a tone of the preview image. After the electronic device 100 detects that the user has enabled the LUT function for a period of time, for example, after one second, the electronic device 100 may display the user interface 31 as shown in FIG. 3F, to display the LUT template included in the LUT function.

Figure 3F:
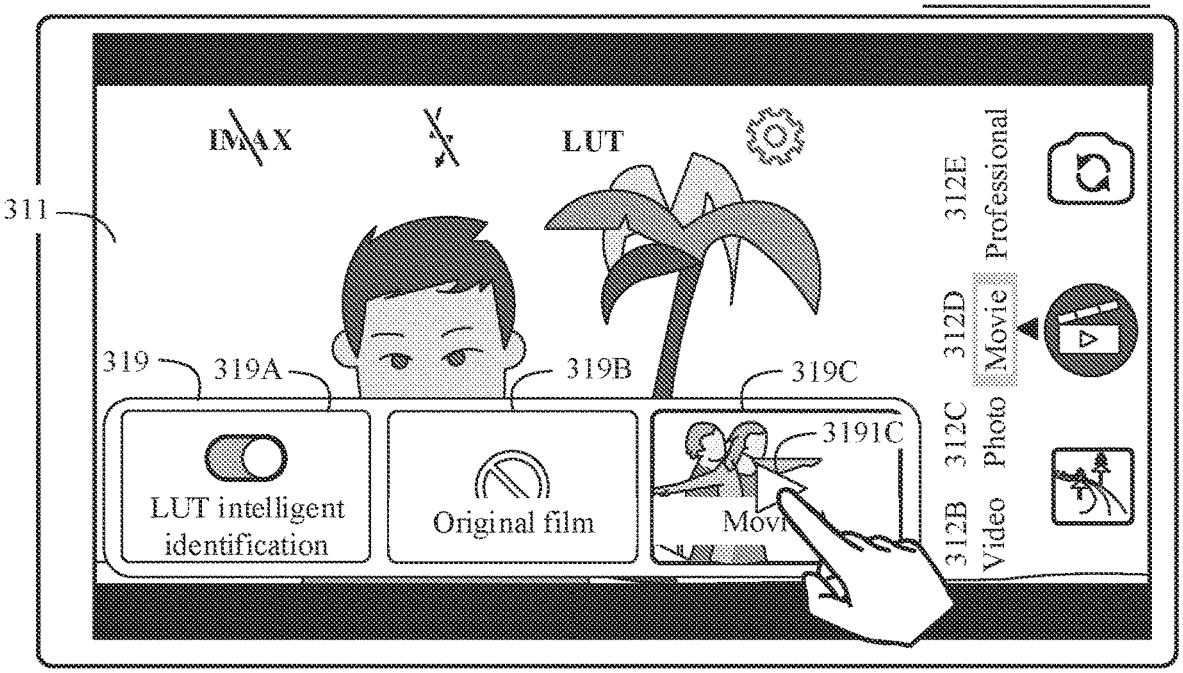
Figure 3G:
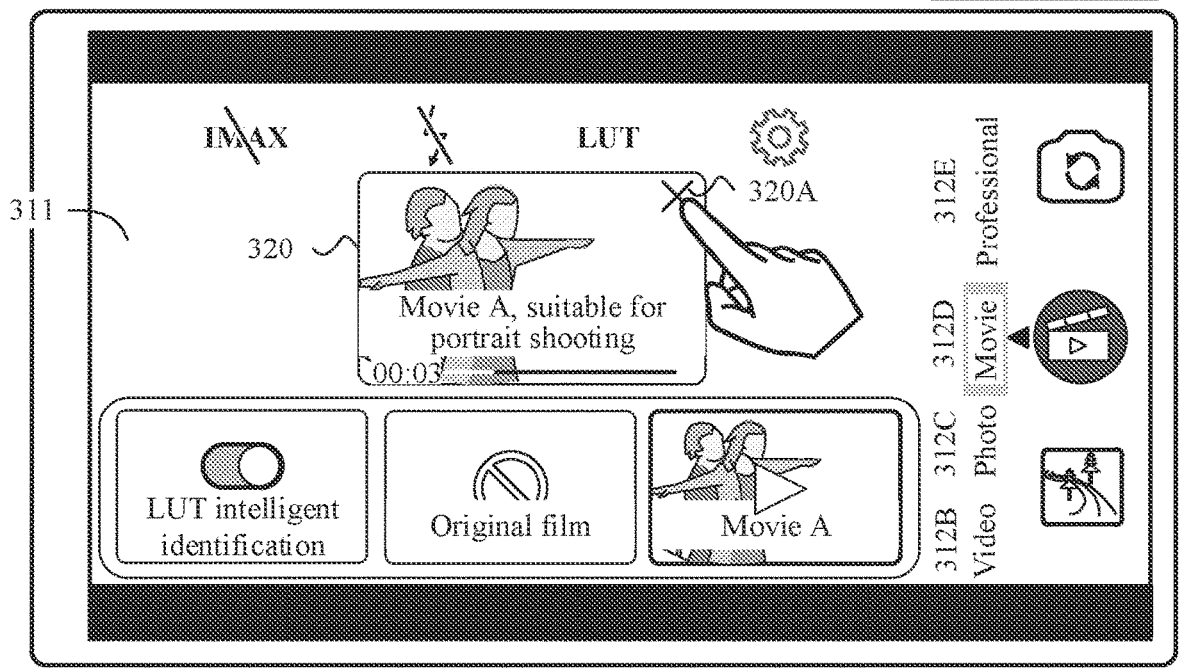

As shown in FIG. 3F, the user interface 31 includes an LUT preview window 319, and the LUT preview window 319 is used to display one or more LUT templates that are preset in or loaded online by the electronic device 100. The LUT preview window 319 may include an intelligent identification control 319A, a first LUT template option 319B, and a second LUT template option 319C. The intelligent identification control 319A is used to enable or disable a function of intelligently recommending the LUT template of the electronic device 100, and by default, the intelligent identification control 319A is initially turned on. When the electronic device 100 detects a touch operation performed by the user on the intelligent identification control 319A, the electronic device 100 no longer intelligently recommends the LUT template the next time the LUT function is enabled, and the intelligent identification control 319A is disabled. The first LUT template option 319B does not include the LUT template, and when the electronic device 100 detects an operation performed by the user on the first LUT template option 319B, the electronic device 100 disables the LUT function, and the preview image displays an original movie effect. The second LUT template option 319C is an LUT template included in the LUT function. The LUT preview window 319 may also detect an operation performed by the user to slide left and right, and in response to the operation, the electronic device 100 displays another LUT template. The second LUT template option 319C displays a movie picture corresponding to a movie theme thereof, and a name of the LUT template, for example, the name may be a name of the movie corresponding to the LUT template, or a name related to the movie. When the electronic device 100 uses the LUT template, the LUT template may be displayed in the LUT preview window 319 in a selected state. Specifically, as shown in FIG. 3F, when the second LUT template option 319C is in the selected state, a border of the second LUT template option 319C is a bold solid line. Further, the second LUT template option 319C further includes a playback control 3191C, and the playback control 3191C is used to prompt the user that the second LUT template option 319C may be displayed as a playable video. The playback control 3191C may detect a touch operation of the user, and in response to the operation, the electronic device 100 may display the user interface 31 as shown in FIG. 3G, to play a video picture corresponding to the second LUT template option 319C.

In some embodiments, after the electronic device 100 receives an operation performed by the user to enable the LUT function, the electronic device 100 may simultaneously display the prompt information and one or more LUT templates included in the LUT function after intelligently recommending the LUT template. That is, after the electronic device 100 detects an operation performed by the user on the LUT option 317C, the electronic device 100 may add the template LUT to the preview image, and on a user interface, the prompt information 318 in FIG. 3E and the LUT preview window 319 in FIG. 3F are simultaneously displayed.

In some embodiments, the intelligent identification control 319A may be disabled by default. After the electronic device 100 detects an operation performed by the user on the LUT option 317C, the electronic device 100 displays the LUT preview window 319 as shown in FIG. 3F. After the electronic device 100 detects an operation performed by the user on one of the LUT templates in the LUT preview window 319, the electronic device 100 adjusts the display effect of the preview image based on the LUT template. Further, when the electronic device 100 detects an operation performed by the user on the intelligent identification control 319A, in response to the operation, the electronic device 100 automatically selects an LUT template, and adjusts the display effect of the preview image based on the LUT template.

In some embodiments, the electronic device 100 may select the LUT template based on a sliding operation of the user. Specifically, after the electronic device 100 detects an operation performed by the user to enable the LUT function, and displays the LUT preview window 319, the electronic device 100 may select the first LUT template located in the LUT preview window 319 by default as the LUT template selected by the electronic device 100. Then, the electronic device 100 may detect the left and right sliding operations performed by the user on the LUT preview window 319, to move a location of each LUT template in the LUT preview window 319, and when the electronic device 100 no longer detects the sliding operations of the user, the electronic device 100 uses the first LUT template displayed in the LUT preview window 319 as the LUT template selected by the electronic device 100.

Figure 3H:
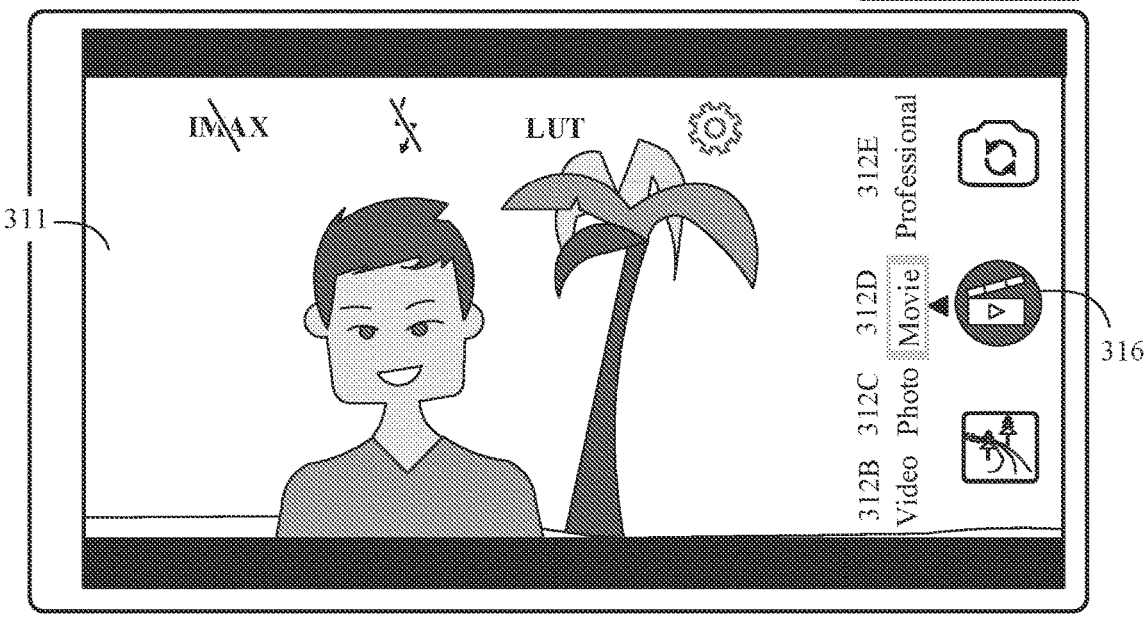

As shown in FIG. 3G, the user interface 31 includes a template display window 320, the template display window 320 is used to display a video corresponding to an LUT template selected by a current user, the video may be a movie clip corresponding to the LUT template, and the user can learn an adjustment effect of the currently selected LUT template on the image by previewing the video, so that a process in which the user edits the image is more vivid and interesting. The template display window 320 includes a close control 320A, and the close control 320A is used to close a video corresponding to the LUT template displayed by the current electronic device 100 and display the user interface 31 as shown in FIG. 3H. On the user interface 31 shown in FIG. 3H, the preview image displayed in the preview box 311 is an image to which the LUT template is added.

In some embodiments, in addition to using the LUT template to change the display effect of the preview image, after adding the LUT template, the electronic device 100 may detect an operation performed by the user to start recording the video, and in response to the operation, the electronic device 100 starts recording the video, so as to obtain the video adjusted the display effect by using the LUT template. In addition, during recording the video, the electronic device 100 may also detect an operation performed by the user to take a photo, and in response to the operation, the electronic device 100 saves the preview image to which the LUT template is added in the preview box as a picture, so as to obtain an image adjusted the display effect by using the LUT template.

It may be understood that the embodiment of this application does not limit a manner of triggering the electronic device 100 to display a video corresponding to the LUT template. For example, a playback control that can be triggered by the user can be displayed in the LUT template (such as the playback control 3191C as shown in FIG. 3F). After detecting an operation performed by the user on the playback control, the electronic device 100 plays a video corresponding to the LUT template. For another example, the electronic device 100 may play the video corresponding to the LUT template when the LUT template is in a selected state and an operation performed by the user on the LUT template is received again. This is not limited in this embodiment of this application.

FIG. 4A to FIG. 4E show examples of some user interfaces used in the IMAX function during shooting.

Figure 4A:
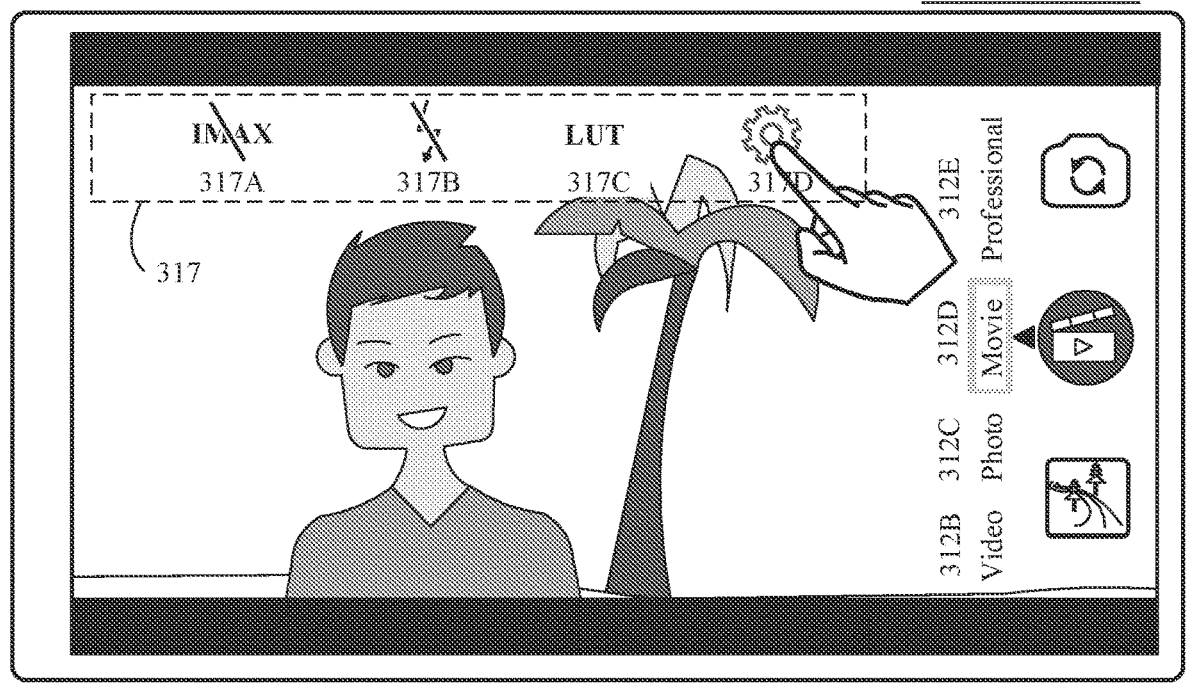

FIG. 4A shows an example user interface 31 displayed when the electronic device 100 enters a movie mode. As shown in FIG. 4A, the electronic device 100 may detect a touch operation performed by the user on the setting option 317D, and in response to the operation, the electronic device 100 displays the user interface 41 as shown in FIG. 4B.

Figure 4B:
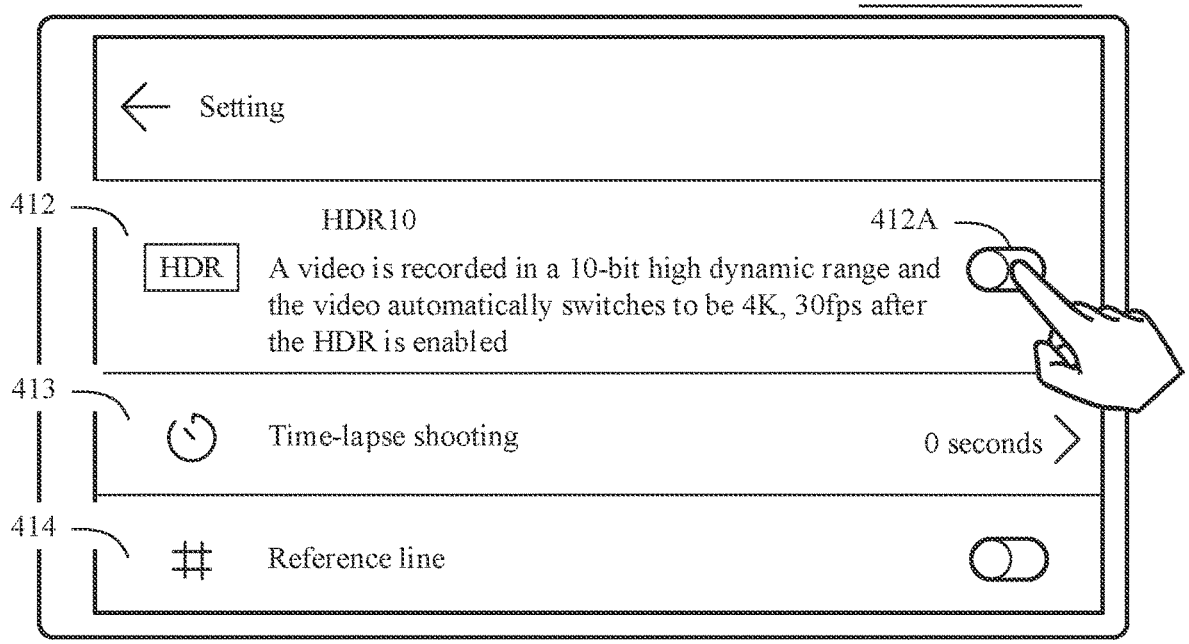
Figure 4C:
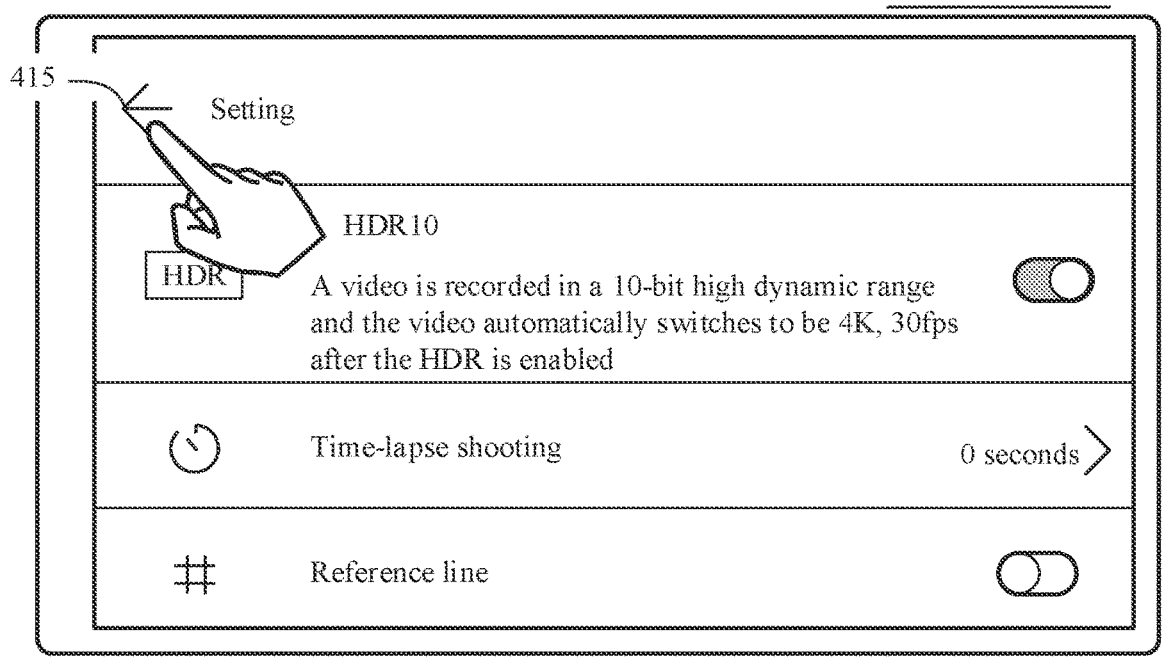

As shown in FIG. 4B, the user interface 41 may be a shooting setting interface of the electronic device 100, and the interface may include one or more shooting setting options such as an HDR10 option 412, a time-lapse shooting option 413, and a reference line option 414. The HDR10 option 412 may be used to enable or disable an HDR10 mode. In the HDR10 mode, HDR is a high dynamic range (HDR). In comparison with a common image, the HDR may provide more dynamic ranges and image details, and can better reflect a visual effect in the real environment. 10 in HDR10 indicates 10 bits. In HDR10, a video can be recorded in a 10-bit high dynamic range, and this mode enables a video recorded by the electronic device 100 to have a resolution of 4K, 30 fps. The HDR10 option 412 includes a switch control 412A, and the switch control 412A is used to monitor an operation performed by the user to trigger enabling or disabling of the HDR10 mode. By default, the HDR10 mode is initially disabled, and in this case, a body color of the switch control 412A may be white as shown in FIG. 4A. When the electronic device 100 detects a touch operation performed by the user on the switch control 412A, in response to the operation, the electronic device 100 enables the HDR10 mode, and a main body color of the switch control 412A may be black as shown in FIG. 4C. The time-lapse shooting option 413 may be used to adjust a time at which the electronic device 100 starts recording a video in time-lapse. The reference line option 414 may display a reference line in the preview box 311 of the user interface 31, to assist the user in adjusting a composition effect of the shooting.

As shown in FIG. 4C, the HDR10 mode is enabled, but even if the electronic device 100 detects that the user starts recording a video, the electronic device 100 cannot record a video with a resolution of 4K, 30 fps in this case, and the electronic device 100 needs to detect that the user has enabled the IMAX function before the HDR10 mode can be enabled in association. As shown in FIG. 4C, the user interface 41 further includes an exit control 415, and the exit control 415 may be used to monitor an operation performed by the user to trigger exiting of the shooting setting interface. The electronic device 100 may detect an operation performed by the user on the exit control 415, and in response to the operation, the electronic device 100 exits the user interface 41 and displays an upper user interface, namely, the user interface 31.

Figure 4D:
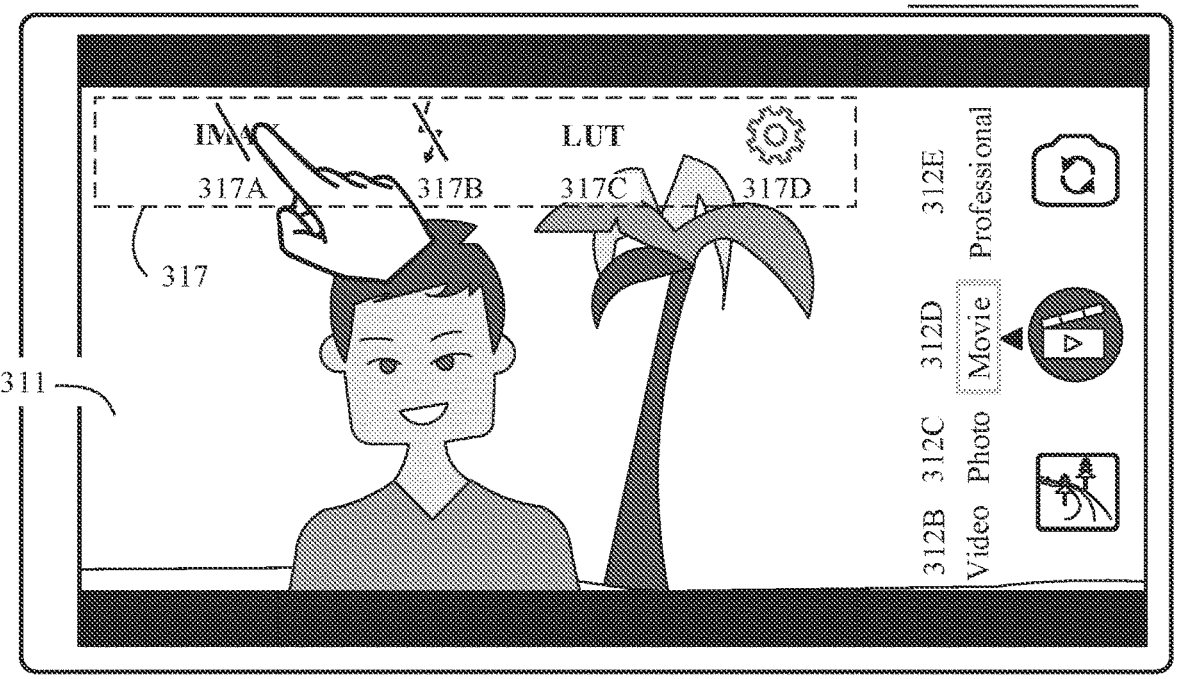
Figure 4E:
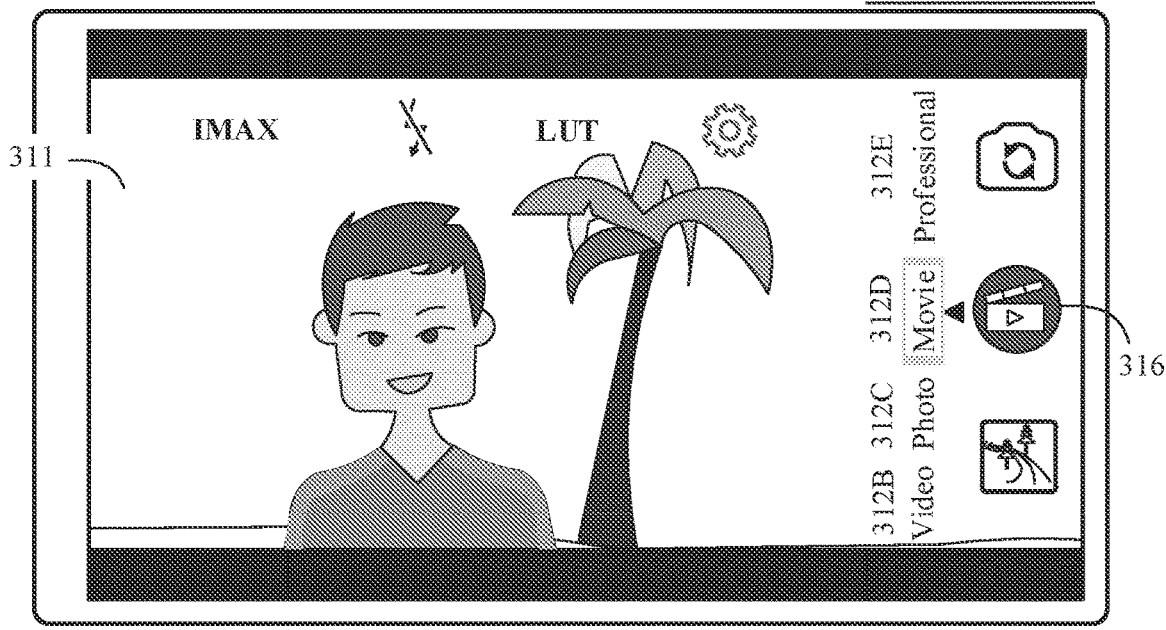

As shown in FIG. 4D, the electronic device 100 can detect a touch operation performed on the IMAX option 317A, and in response to the operation, an icon displayed by the IMAX option 317A is updated to be an icon displayed by the IMAX option 317A shown in FIG. 4E, and the electronic device 100 enables the IMAX function. Because the electronic device 100 enables the HDR10 mode by using the shooting setting interface, the HDR10 mode is also enabled after the electronic device 100 enables the IMAX function. The IMAX function may be used to increase a color depth of the preview image, so that a color of the image is more delicate and more vivid. The color depth represents a quantity of bits used to store a color of 1 pixel in a bitmap or video buffer. The higher the color depth, the smoother a transition between colors in the image, and the more true the color can be restored.

As shown in FIG. 4E, a preview image shown in FIG. 4E is more colorful in comparison with the preview image displayed in the preview box 311 in FIG. 4D. In addition, the electronic device 100 may also detect a touch operation performed on the movie shutter control 316. In response to the operation, after the electronic device 100 enables the IMAX function, the image displayed in the preview box 311 is recorded as a video, and a resolution of the video is 4K, 30 fps, and color of the image is richer and more delicate.

It should be noted that the IMAX function and the HDR10 mode are designed in association, and after the electronic device 100 enables the HDR10 mode by using the shooting setting interface (for example, the user interface 41 shown in FIG. 4B), the electronic device 100 can enable the HDR10 mode simultaneously when the IMAX function is enabled. When the electronic device 100 does not enable the HDR10 mode, that the electronic device 100 enables IMAX function is not associated with the HDR10 mode. In addition, after the electronic device 100 enables the IMAX function, the electronic device 100 may display prompt information, to prompt that the HDR10 mode is also enabled simultaneously when the user enables the IMAX function. The IMAX function and the HDR10 mode linkage setting can associate a frame rate adjustment and a color depth adjustment of the image together. Because when the user needs to obtain a more delicate color image, the user usually needs a clearer image. When the user enables the IMAX function, the HDR10 mode is also enabled simultaneously, to facilitate a user's operation and improve user experience.

FIG. 5A to FIG. 5G show examples of some user interfaces used in time-lapse shooting during shooting.

Figure 5A:
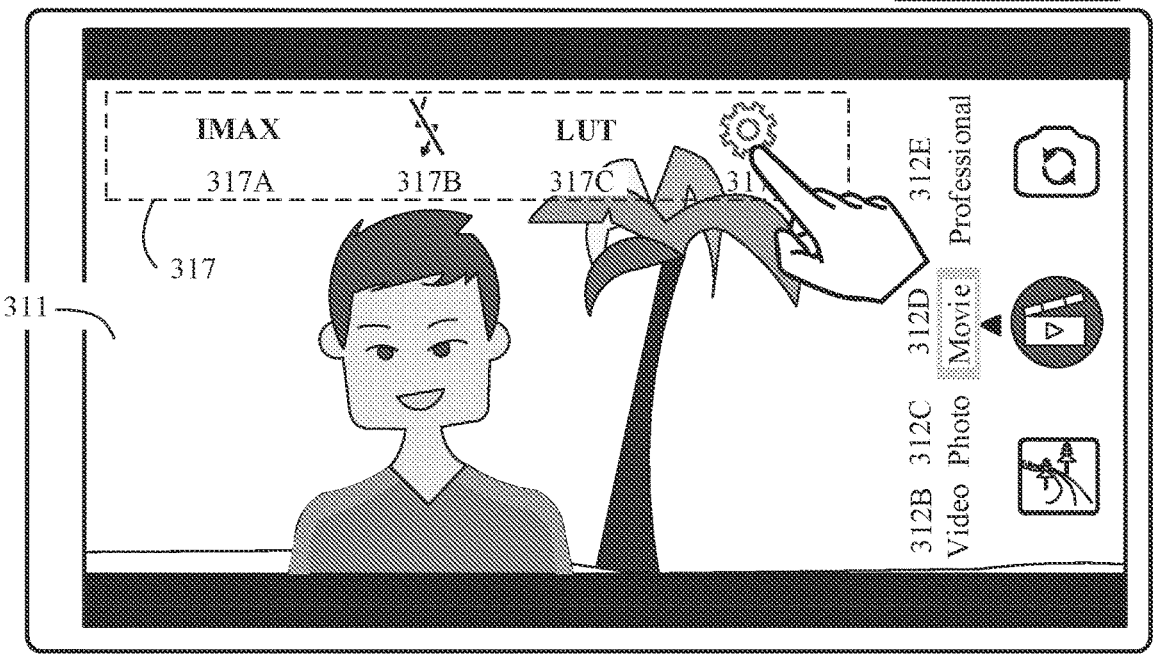

FIG. 5A shows an example user interface 31 displayed when the electronic device 100 enters a movie mode. As shown in FIG. 5A, the electronic device 100 may detect a touch operation performed by the user on the setting option 317D, and in response to the operation, the electronic device 100 displays the user interface 41 as shown in FIG. 5B.

Figure 5B:
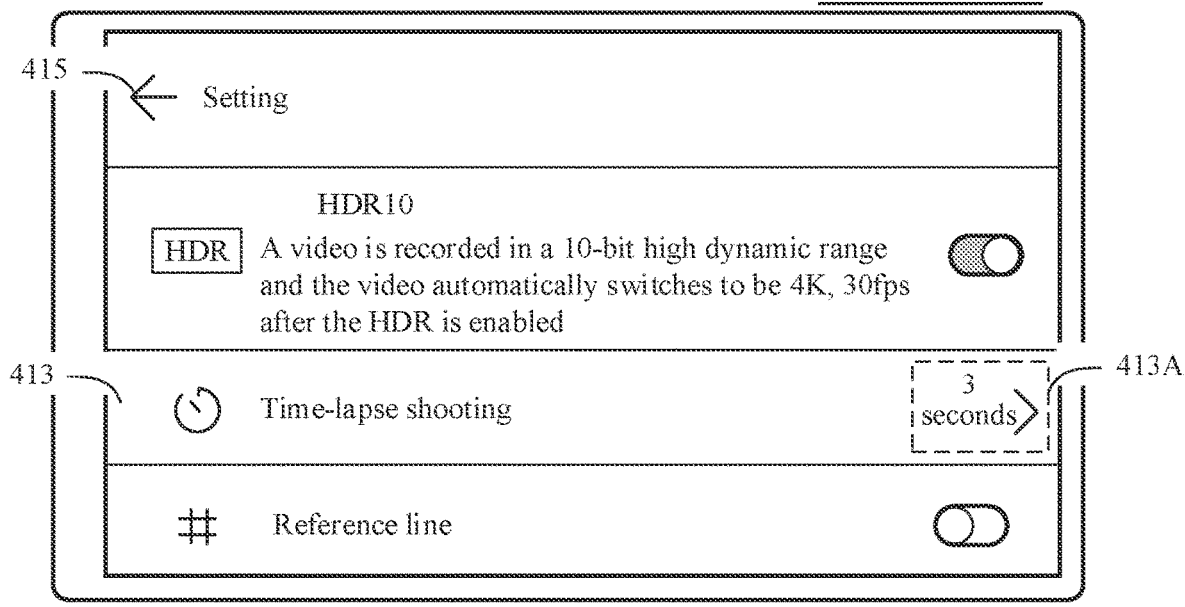

As shown in FIG. 5B, the user interface 41 may be a shooting setting interface of the electronic device 100. The time-lapse shooting option 413 includes a time adjustment option 413A, and the time adjustment option 413A may display a time-lapse shooting time set by the electronic device 100, for example, three seconds, and further the electronic device 100 may receive a touch operation performed on the time adjustment option 413A, and in response to the operation, the electronic device 100 adjusts the time-lapse shooting time. It can be seen from the time adjustment option 413A shown in FIG. 5B, the time-lapse shooting time set by the electronic device 100 is three seconds, and the electronic device 100 may display a movie recording animation special effect with a countdown of three seconds after detecting an operation performed by the user to start recording. After the electronic device 100 detects a touch operation performed on the exit control 415, in response to the operation, the electronic device 100 returns to the shooting interface, to display the user interface 31 as shown in FIG. 5C.

Figure 5C:
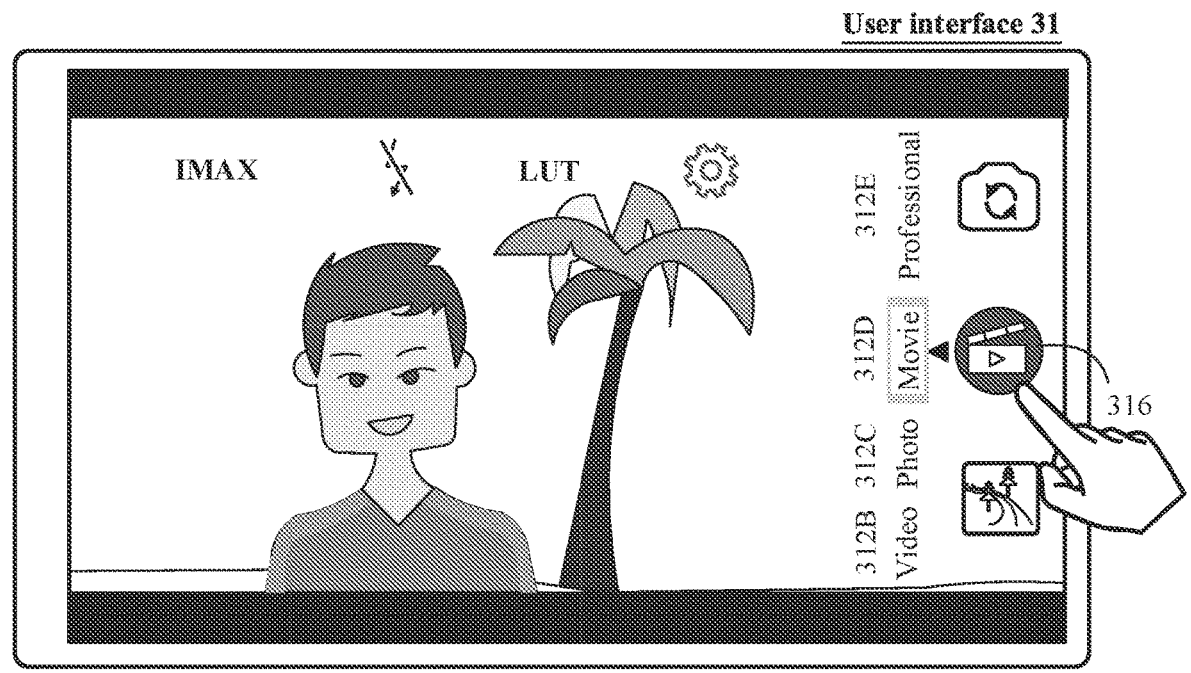
Figure 5D:
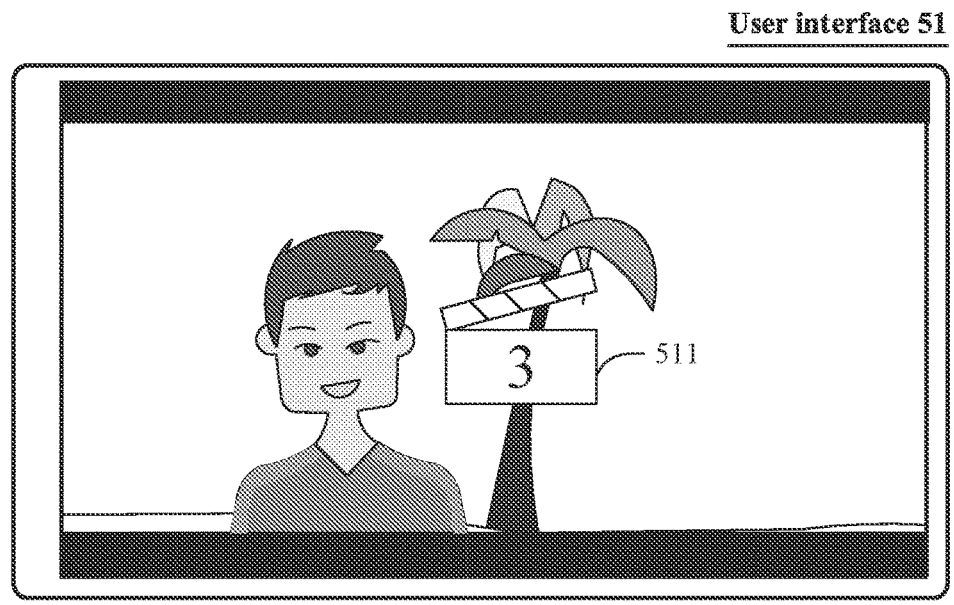
Figure 5E:
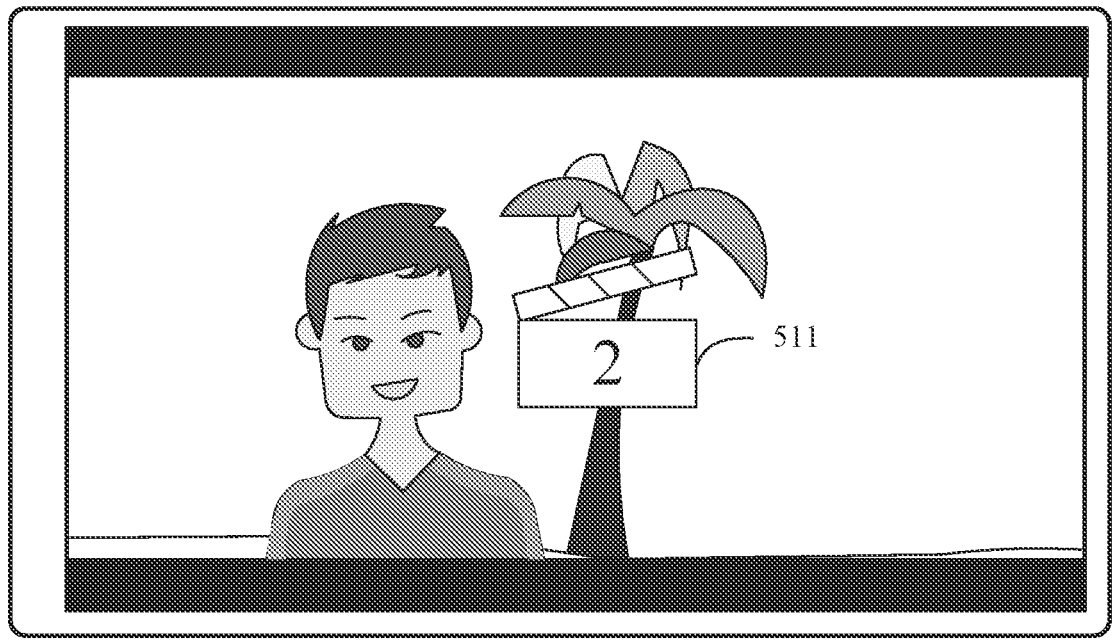
Figure 5F:
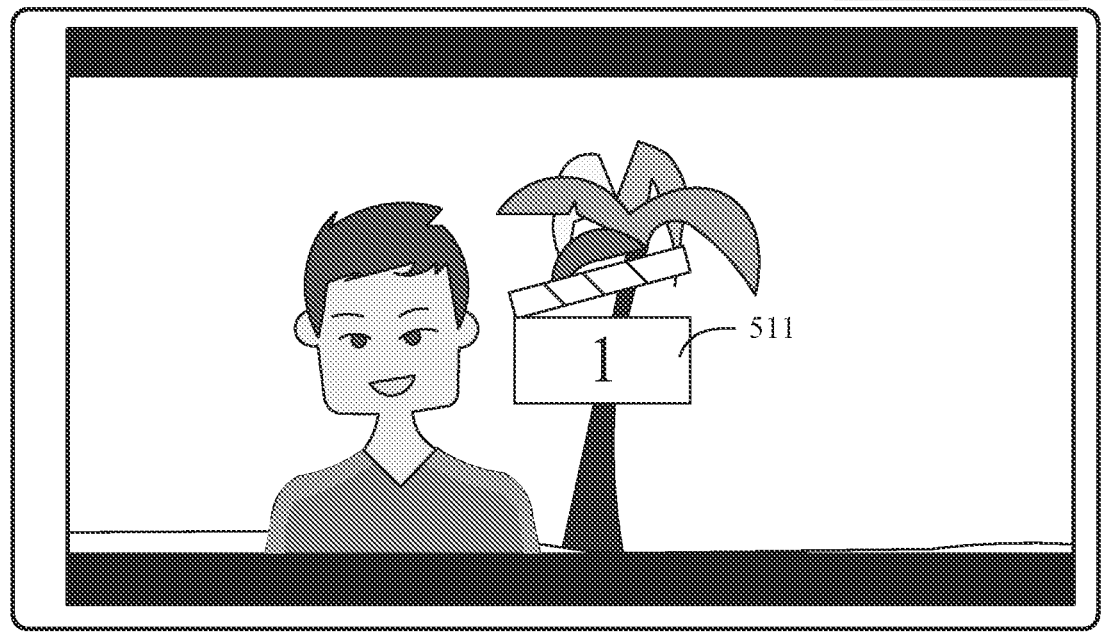

As shown in FIG. 5C, the electronic device 100 may detect a touch operation performed on the movie shutter control 316, and in response to the operation, the electronic device 100 counts down to record a video and sequentially displays a user interface as shown in FIG. 5D, FIG. 5E, and FIG. 5F, and the user interface is used to display a countdown animation, to prompt the user that the electronic device 100 starts recording the video.

It can be seen from FIG. 5D to FIG. 5F, after the electronic device 100 detects the touch operation performed by the user on the movie shutter control 316, an image captured by the camera and a slate icon 511 may be displayed on a user interface 51. A difference is that a time displayed in the slate icon 511 varies as time goes on, and when the time-lapse shooting set by the electronic device 100 is three seconds, numbers displayed in the slate icon 511 are sequentially display as the numbers 3, 2, and 1 following the countdown. When the countdown is 0, the electronic device 100 displays a user interface 61 as shown in FIG. 5G.

Figure 5G:
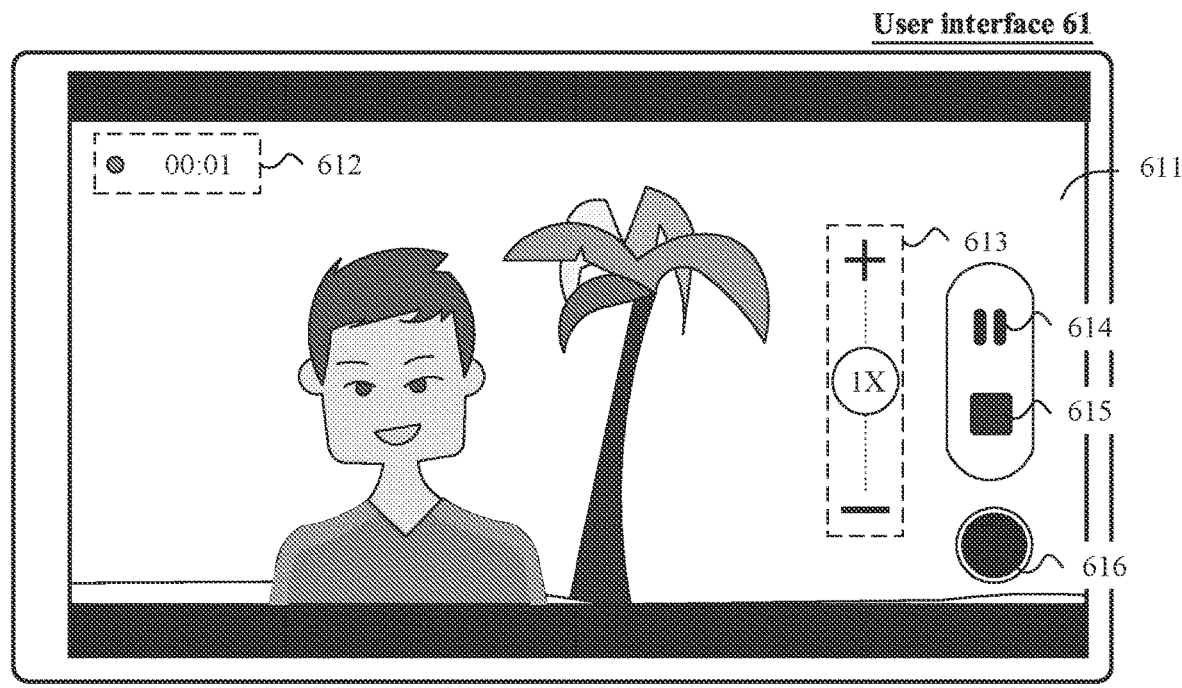

As shown in FIG. 5G, the user interface 61 is a user interface provided when the electronic device 100 records a video. The user interface 61 includes a recording box 611, a recording time 612, a zoom control 613, a pause recording control 614, an end recording control 615, and a photographing control 616. The image captured by the camera is displayed in the recording box 611, or further, an image adjusted by the electronic device 100 based on a shooting parameter is displayed in the recording box 611, for example, an image adjusted by the electronic device 100 after enabling the IMAX function and the LUT function. In addition, the recording box 611 may include black edges of an upper boundary and a lower boundary, and the electronic device 100 may record content in the recording box 611 as a video. The recording time 612 is used to display a time interval from a time at which the electronic device 100 starts recording the video to a current time. For example, when the recording time 612 is displayed as "00:01", it indicates that the electronic device 100 has recorded a video of one second. The zoom control 613 may be used to adjust and display zoom magnification of the electronic device 100. The pause recording control 614 may be used to pause recording of a video, the end recording control 615 may be used to end recording of a video, and save the video recorded by the electronic device 100 in a gallery, and the photographing control 616 may be used to monitor an operation performed by the user to trigger photographing during video recording. When the electronic device 100 detects an operation performed by the user on the photographing control 616, the electronic device 100 saves content displayed in a current recording box 611 as a picture.

In other words, in the movie mode, when enabling the time-lapse shooting function, the electronic device 100 can display a slate countdown animation during the countdown shooting, to make the shooting more interesting.

FIG. 6A to FIG. 6D show examples of some user interfaces used in the LUT function in a professional mode.

Figure 6A:
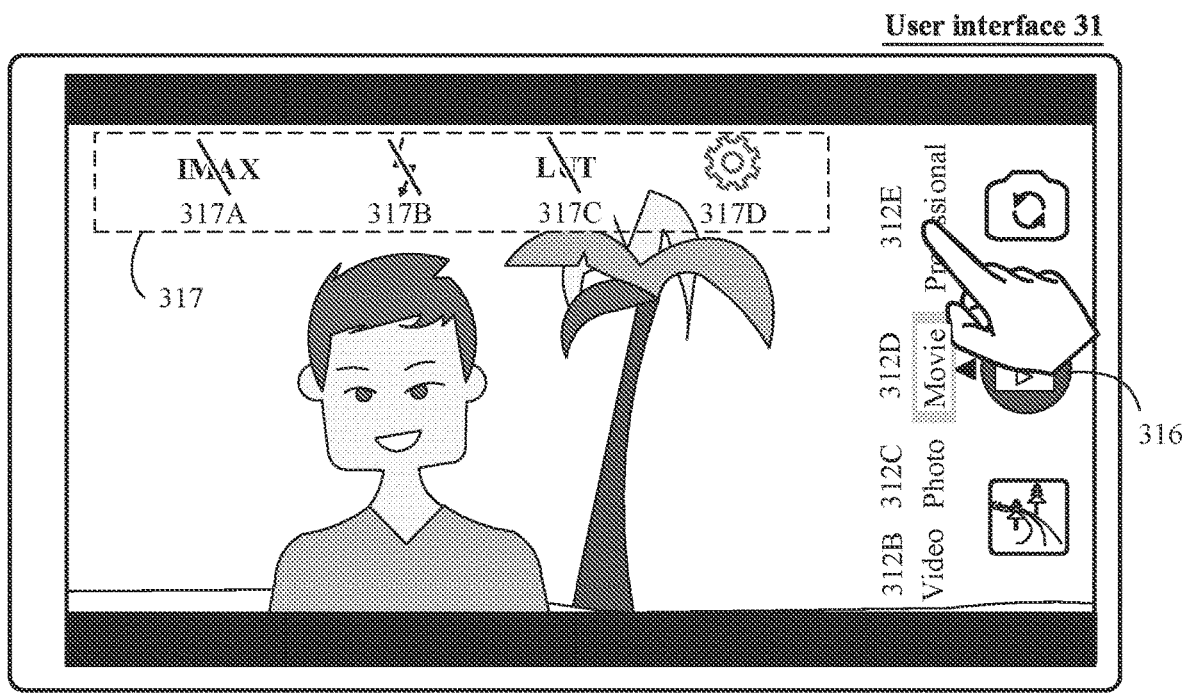
Figure 6B:
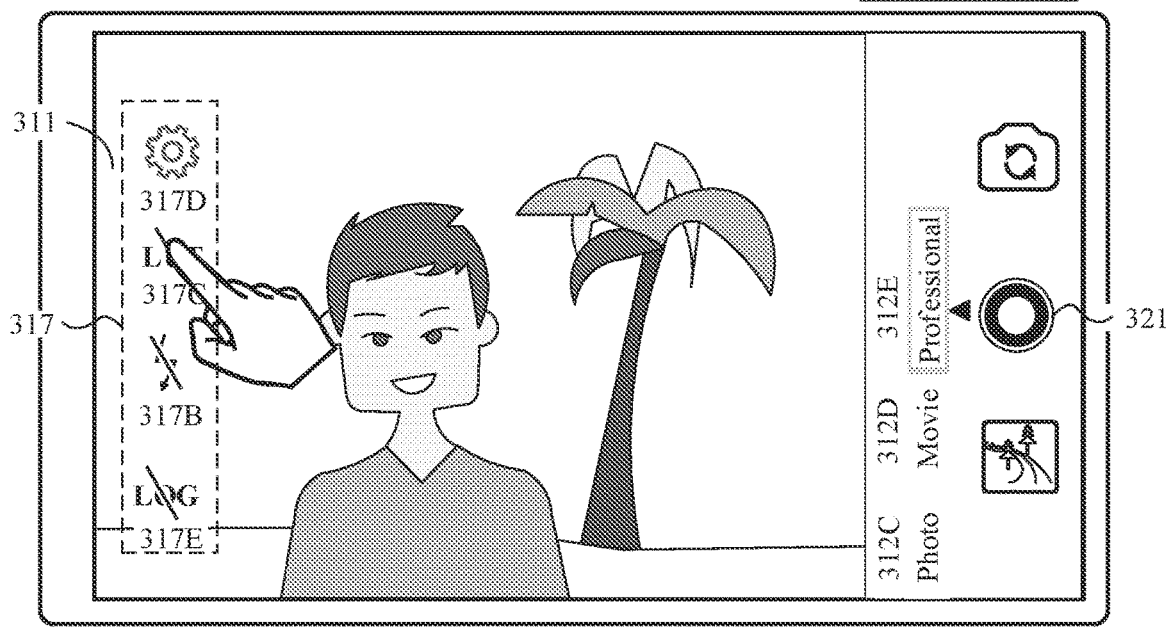

FIG. 6A shows an example user interface 31 displayed when the electronic device 100 enters a movie mode. As shown in FIG. 6A, the electronic device 100 may detect a touch operation performed by the user on a professional mode option 312E, and in response to the operation, the electronic device 100 displays the user interface 31 as shown in FIG. 6B. The function option 317 are updated from a horizontal arrangement in FIG. 6A to be a vertical arrangement in FIG. 6B, and the functions included in the function option 317 are updated as follows: a LOG option 317E, a flash option 317B, an LUT option 317C, and a setting option 317D. The movie shutter control 316 is updated to be a recording control 321. For description of the LOG option 317E, refer to the following content. For the flash option 317B, the LUT option 317C, and the setting option 317D, refer to the foregoing content.

In some embodiments, the electronic device 100 may enable the professional mode by default after enabling the camera application. In addition, the electronic device 100 may also enable the professional mode in another way, for example, the electronic device 100 may also enable the professional mode based on a voice instruction of the user. This is not limited in this embodiment of this application.

Figure 6C:
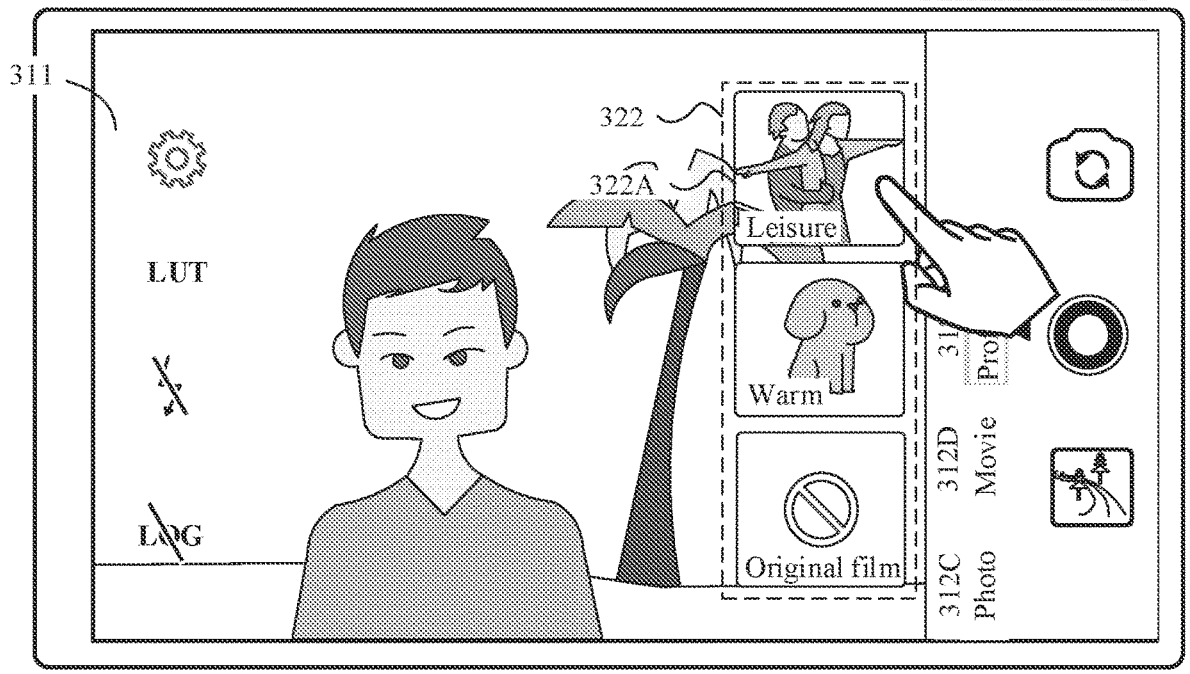

As shown in FIG. 6B, the electronic device 100 may detect a touch operation performed on the LUT option 317C, and in response to the operation, the electronic device 100 displays an LUT preview interface 322 as shown in FIG. 6C. The LUT preview window 319 is used to display one or more LUT templates that are preset in or loaded online by the electronic device 100.

As shown in FIG. 6C, the LUT preview window 322 may include a first LUT template 322A, and a name or characteristic of the LUT template may be displayed as "leisure" in the first LUT template 322A. The electronic device 100 may detect a touch operation performed on the first LUT template 322A, and in response to the operation, the electronic device 100 changes a tone of the preview image in the preview box 311, to display the user interface 31 as shown in FIG. 6D.

Figure 6D:
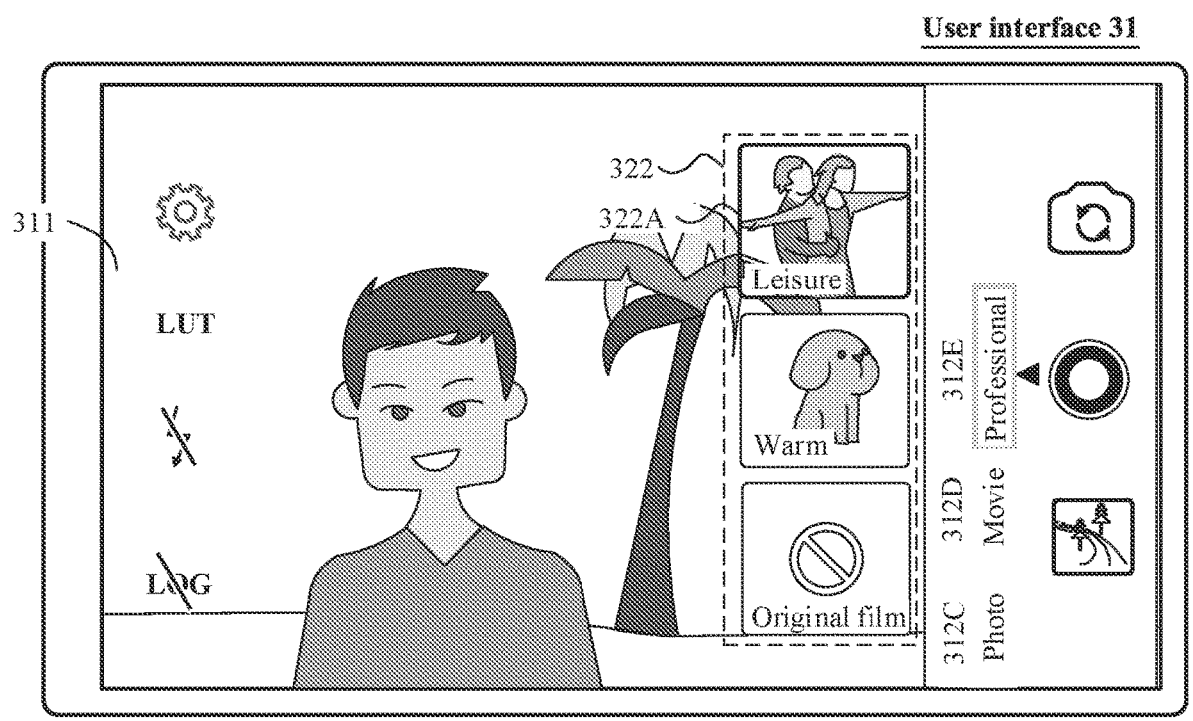

As shown in FIG. 6D, the first LUT template 322A is selected by the electronic device 100, a border of the first LUT template 322A is a thick solid line, and the tone of the preview image displayed in the preview box 311 is different from the tone of the image in the preview box 311 shown in FIG. 6C.

It may be understood that in the professional mode, in addition to using the LUT template to change the display effect of the preview image, the electronic device 100 may detect an operation performed by the user to start recording the video after adding the LUT template, and in response to the operation, the electronic device 100 uses a video of the LUT template to record, so as to obtain a video adjusted the display effect by using the LUT template. In addition, during recording the video, the electronic device 100 may also detect an operation performed by the user to take a photo, and in response to the operation, the electronic device 100 saves the preview image to which the LUT template is added in the preview box as a picture, so as to obtain an image adjusted the display effect by using the LUT template.

In general, the LUT function in the professional mode is similar to the LUT function in the movie mode, and these two modes have a same principle that an LUT is introduced to change an image color value. A difference is that the LUT template in professional mode is displayed as an image, and the LUT template in movie mode is displayed as a video. That is, the LUT function in the professional mode can display an adjustment effect of the LUT template on the preview image more directly through a tone of a picture, and the LUT function in the movie mode can display an adjustment effect of the LUT template on the preview image more interestingly through a tone of a video.

FIG. 7A to FIG. 7D show examples of some user interfaces used in the LOG function during shooting.

Figure 7A:
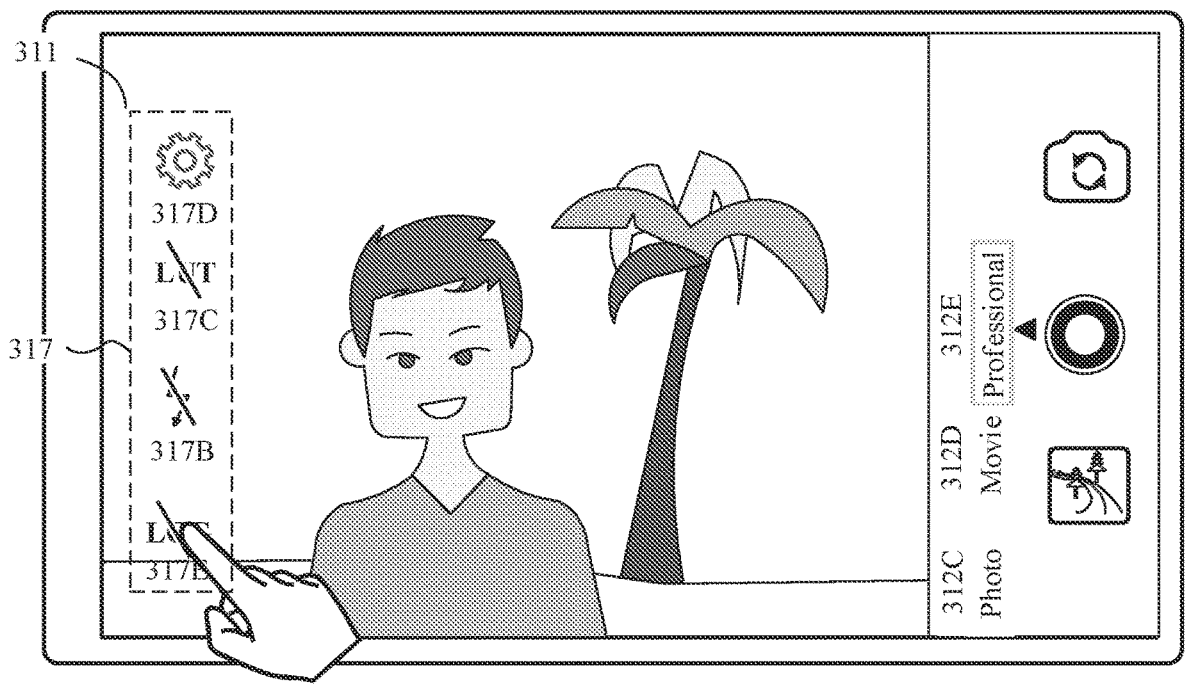
Figure 7B:
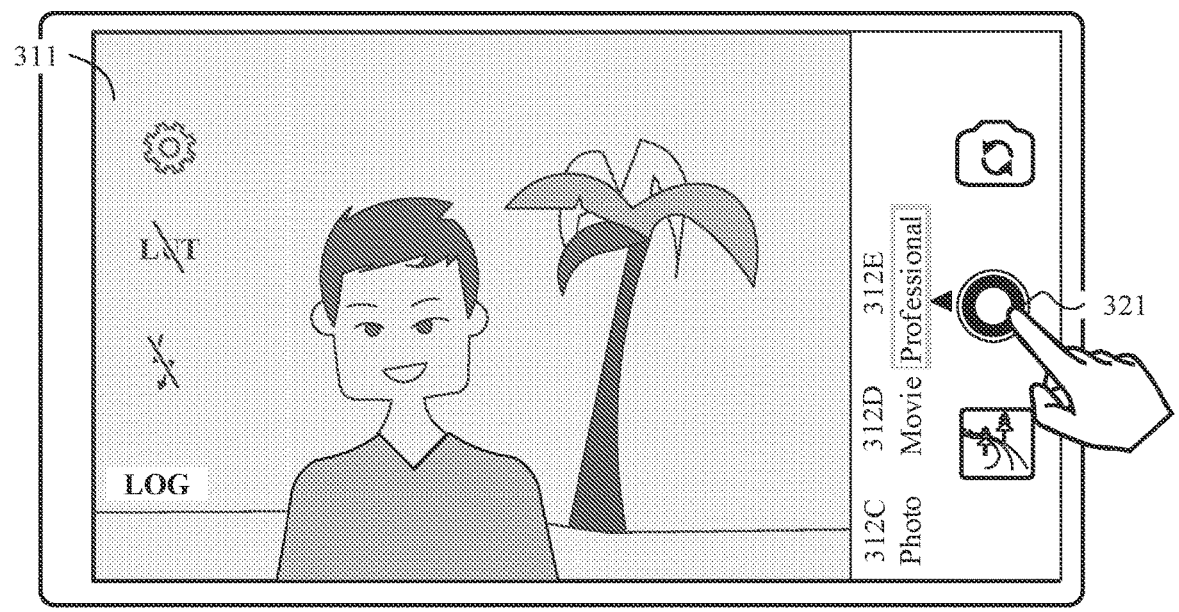

FIG. 7A shows an example user interface 31 displayed when the electronic device 100 enters a professional mode. As shown in FIG. 7A, the electronic device 100 may detect an operation performed by the user on the LOG option 317E, and in response to the operation, the electronic device 100 enables the LOG function, to display the user interface 31 as shown in FIG. 7B. The LOG function can apply a logarithm function to an exposure curve, and keep details of a highlight and shadow part in an image captured by the camera to the maximum, so that saturation of the preview image presented finally is low. A video recorded by using the LOG function is referred to as a LOG video.

As shown in FIG. 7B, the image displayed in the preview box 311 is "grayer" than the image displayed in the preview box 311 in FIG. 7A. When the electronic device 100 detects a touch operation performed by the user on a recording control 321, in response to the operation, the electronic device 100 starts recording, and displays the user interface 31 as shown in FIG. 7C.

Figure 7C:
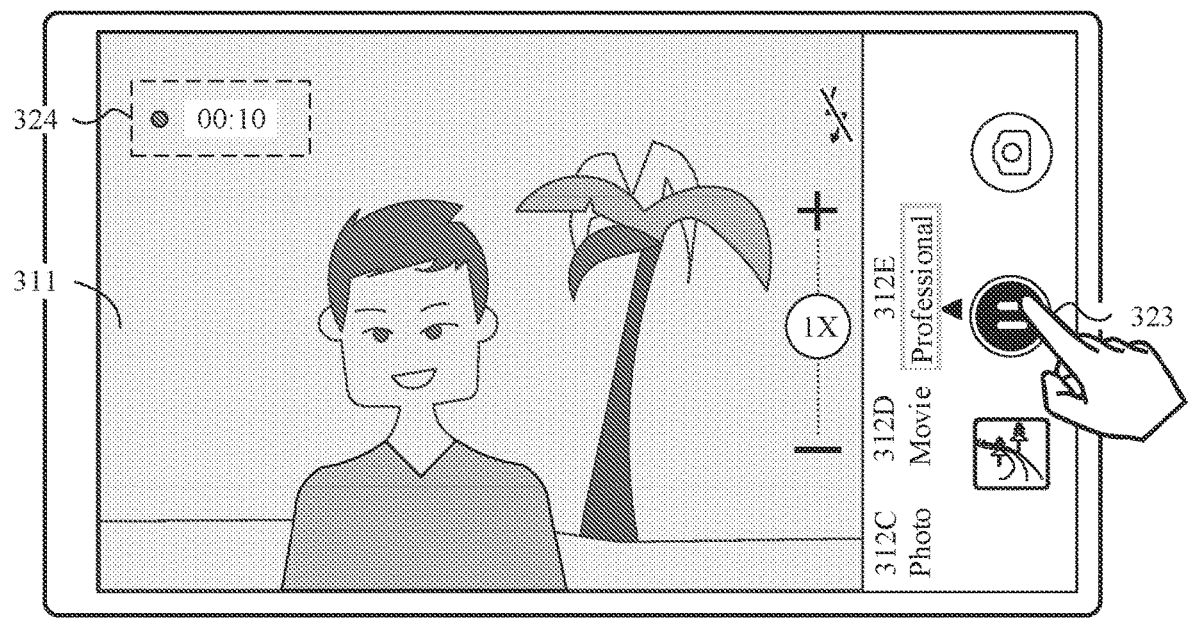

As shown in FIG. 7C, the recording control 321 is updated to be an end recording control 323, and the end recording control 323 may be used to end recording and save the recorded video in the "gallery". The preview box 311 shows a time 324, and the time 324 is used to display the time interval from a time at which the electronic device 100 starts recording the video to a current time. When the electronic device 100 detects that an operation performed by the user on the end recording control 323, in response to the operation, the electronic device 100 ends recording and saves the recorded video to the "gallery".

Figure 7D:
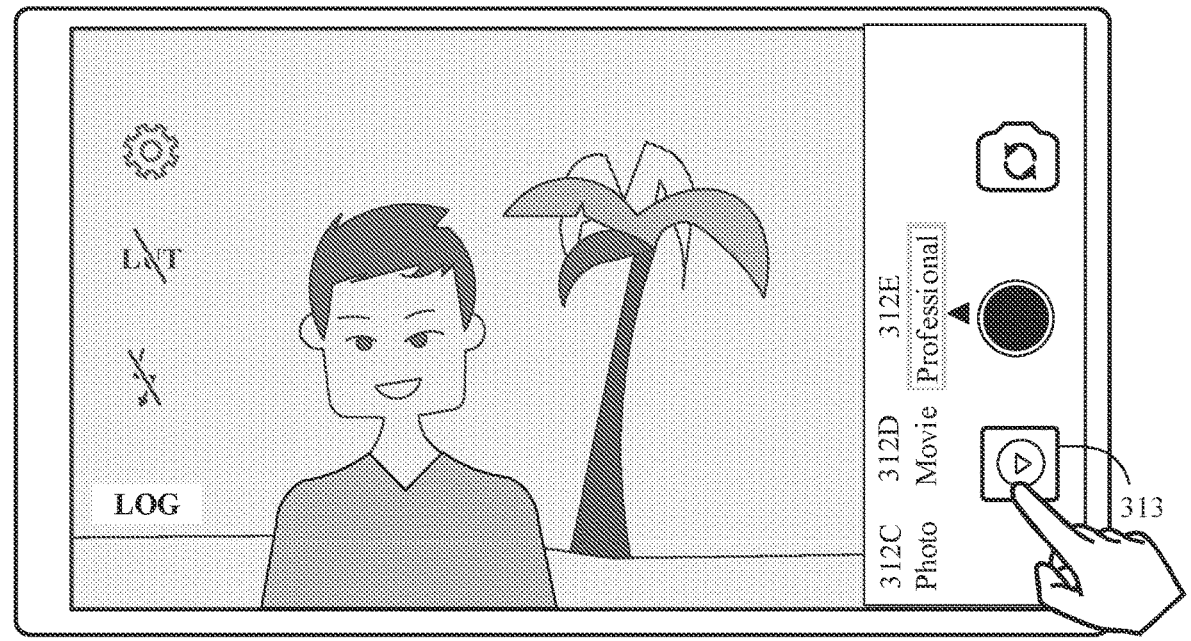

As shown in FIG. 7D, after the electronic device 100 ends recording the video, an image displayed in the gallery shortcut key 313 in FIG. 7C is updated to be an image displayed in the gallery shortcut key 313 in FIG. 7D. The electronic device 100 may detect an operation performed by the user on the gallery shortcut key 313. In response to the operation, the electronic device 100 enters the "gallery" application, and displays the user interface 51 as shown in FIG. 7E, and a video saved recently by the electronic device 100 is displayed on the user interface 51.

Figure 7E:
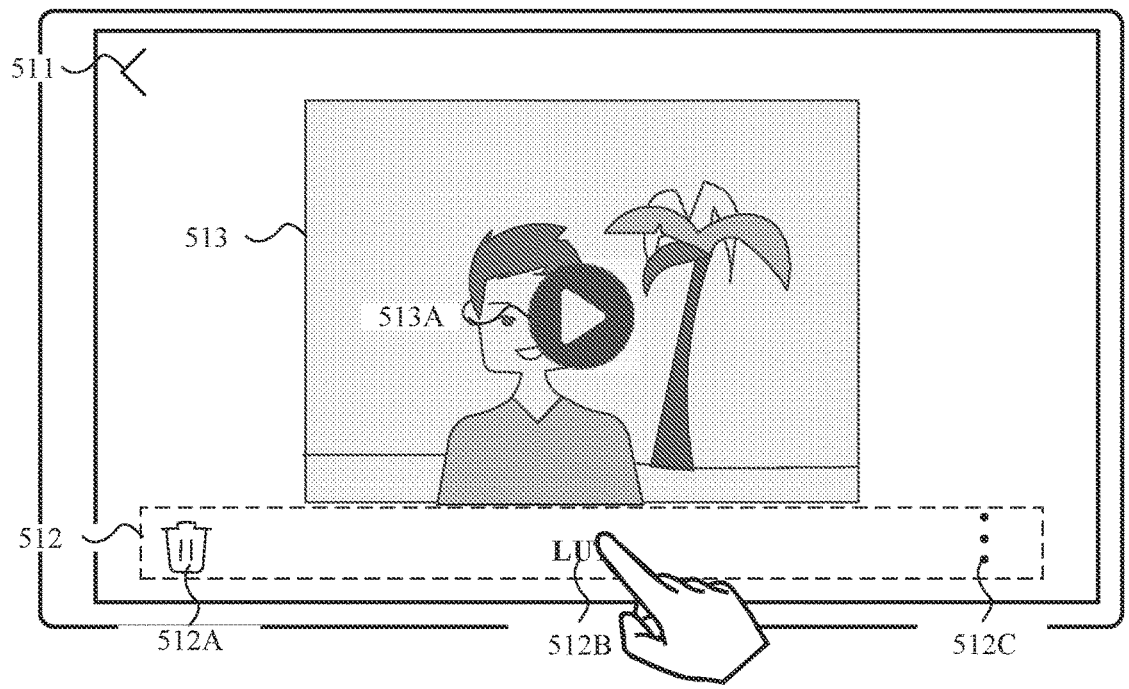

As shown in FIG. 7E, the user interface 51 may include: a return control 511, a menu bar 512, and a video playback window 513. The return control 511 is used to exit the user interface 51 and return to a previous user interface such as the user interface 31 shown in FIG. 7D. The menu bar 512 may include: a deletion control 512A, an LUT control 512B, and a more control 512C. The deletion control 512A may be used to delete a video displayed in the video playback window 513, the LUT control 512B may be used to add an LUT template to the video displayed in the video playback window 513, and the more control 512C may be used to expand more operation options such as forward, and view details. The video playback window 513 is used to display the video recorded by the electronic device 100. The video playback window 513 further includes a playback control 513A, and the electronic device 100 plays the video displayed in the video playback window 513 when the electronic device 100 detects a touch operation performed by the user on the playback control 513A, and the video has a low picture saturation, and an image displayed in each frame presents a "dusky" effect. When the electronic device 100 detects a touch operation performed by the user on the LUT control 512B, in response to the operation, the electronic device 100 may display a plurality of LUT templates as shown in FIG. 7F.

Figure 7F:
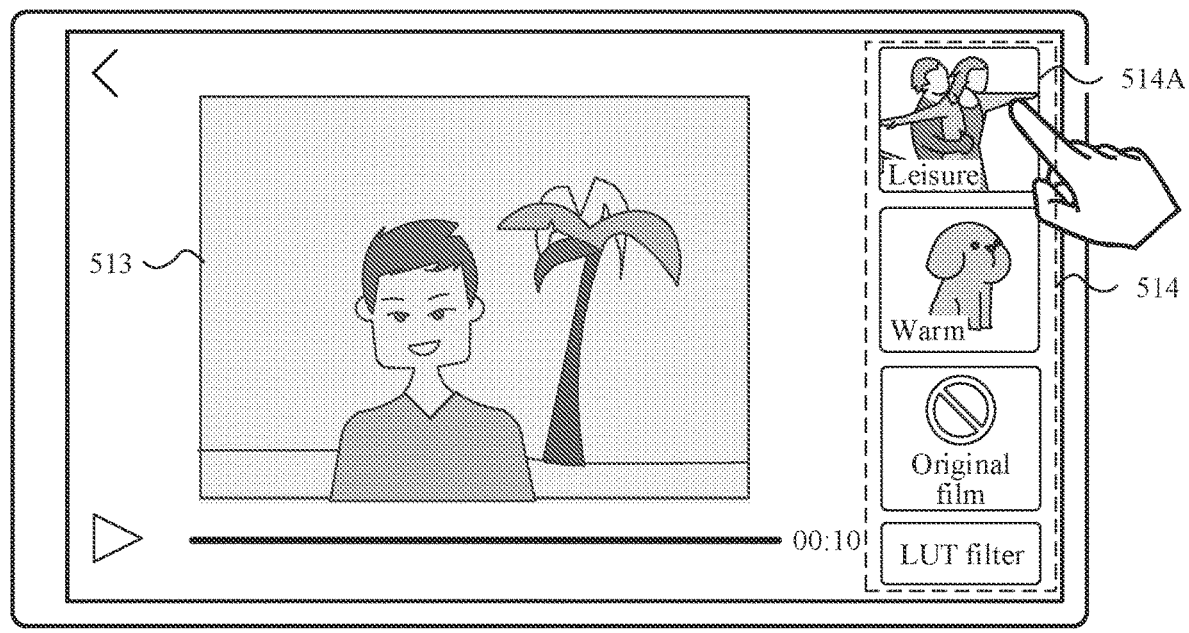

As shown in FIG. 7F, the user interface 51 may include an LUT preview window 514. The LUT preview window 514 may include one or more LUT templates. Specifically, the LUT preview window 514 may include a first LUT template 514A, and when the electronic device 100 detects a touch operation performed on the first LUT template 514A, the electronic device 100 adds the LUT template corresponding to the first LUT template 514A to the video displayed in the video preview window 513, so as to adjust exposure and a color of the video. The adjusted video display effect may be a display effect of a video displayed in the video playback window 513 shown in FIG. 7G.

Figure 7G:
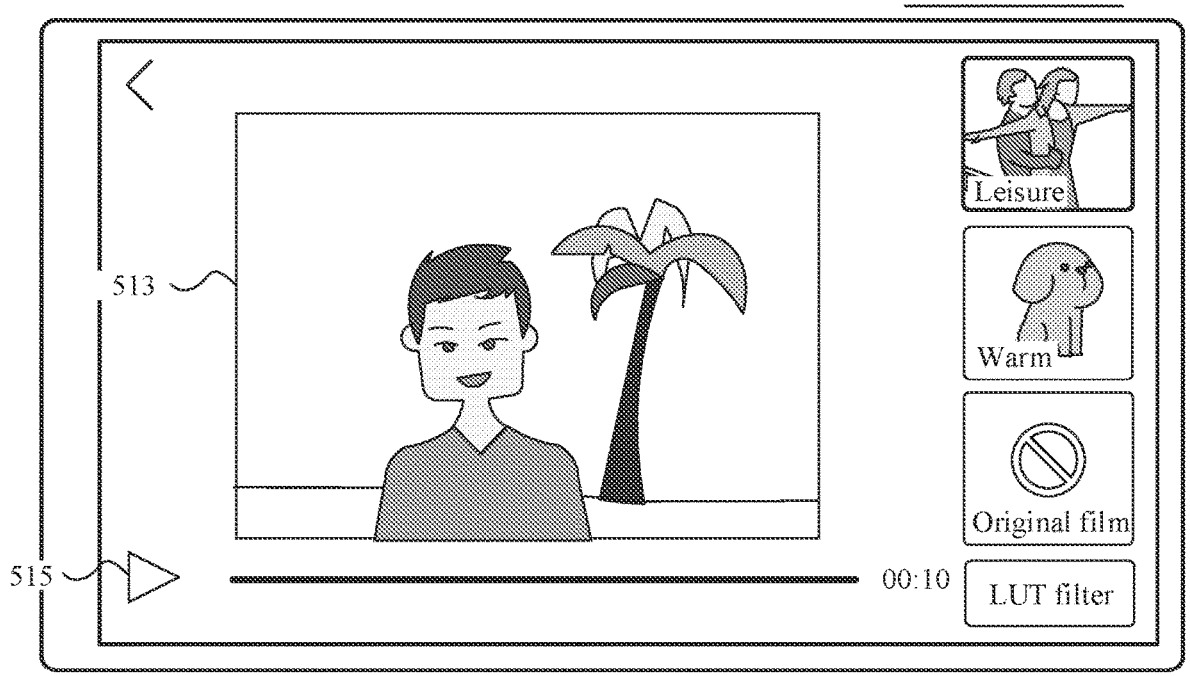

As shown in FIG. 7G, in comparison with FIG. 7F, a video picture displayed in the video playback window 513 is clearer, and colors are richer and brighter. The user interface 51 also includes a playback control 515, and the electronic device 100 starts playing a video in the video playback window 513 when the electronic device 100 detects a touch operation performed on the playback control 515.

Figure 7H:
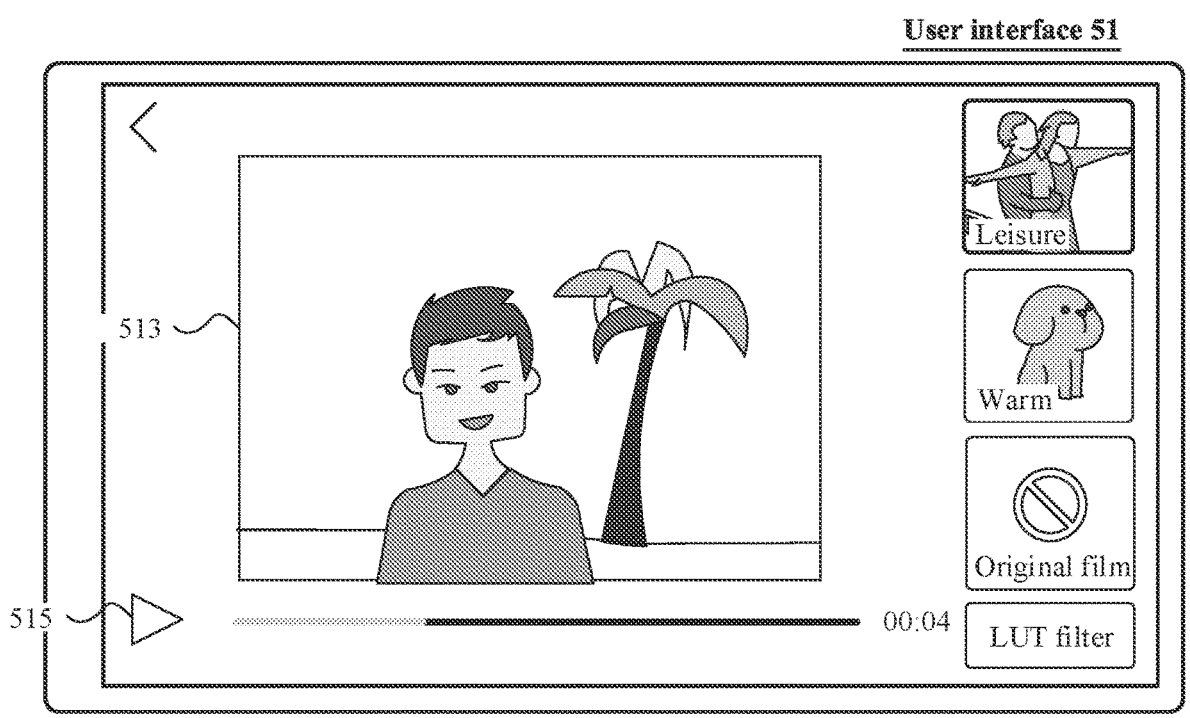

As shown in FIG. 7H, when the video in the video play window 513 is played for four seconds, the video picture displayed in the video play window 513 has a same tone as a video picture shown in FIG. 7G.

It can be seen that, in the professional mode, in addition to recording a video added the LUT template, the electronic device 100 can record a video without adding the LUT template, and then add the LUT template to the video, or record a LOG video after enabling the LOG function, and then add the LUT template to the LOG video. In this way, the electronic device 100 can not only adjust a display effect of the screen before recording the video, but also adjust a display effect of the recorded video after the video recording is completed, so that flexibility and freedom of the image adjustment are increased.

In the foregoing embodiment, the movie mode is more focused on sensory experience of the user, the IMAX function may be used to quickly adjust the image display effect, the time-lapse shooting function may be used to provide an interesting animation effect, and therefore the IMAX function and the time-lapse shooting function are applied to the movie mode. In addition, the professional mode is more focused on that the user can adjust various parameters to adjust the image display effect, the LOG function needs the user to further add the LUT template to the gallery to obtain the image, and therefore the LOG function is applied to the professional mode. It may be understood that all the functions mentioned above, including the IMAX function, the LUT function, the time-lapse shooting function, and the LOG function, may be simultaneously applied to the movie mode or the professional mode, and this is not limited in this embodiment of this application.

The following describes a process of the shooting method provided in an embodiment of this application.

Figure 8:
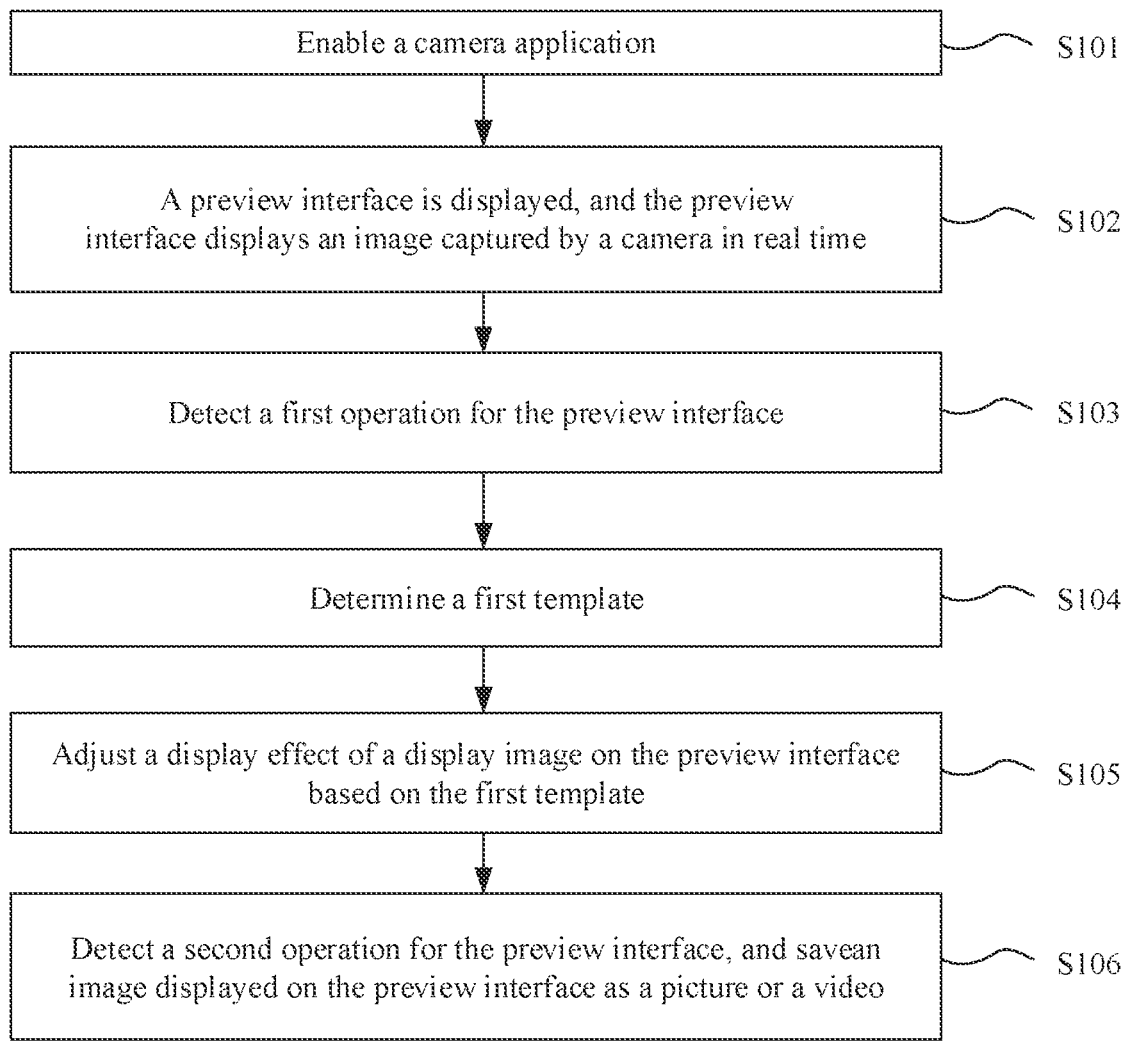
FIG. 8 is a schematic diagram of a process of a shooting method according to an embodiment of this application.

FIG. 8 shows a schematic diagram of a process of an example shooting method. As shown in FIG. 8, the method includes:

Phase 1 (S101 to S102): Open a preview interface.

S101: An electronic device 100 enables a camera application.

In a specific implementation, the electronic device 100 may enable the camera application in response to a user's operation received on a user interface. The user's operation, for example, may be an operation performed by the user on an icon of the camera application on a home screen (such as a tap operation and a touch operation). The user's operation, for another example, may be a left slide operation performed on a lock screen interface of the electronic device 100, or may be an operation performed by the user on a third party application, for example, an operation performed by the user to enable a camera function on a chat interface of a social application.

For example, the electronic device 100 may detect the touch operation performed on the camera application 215 as shown in FIG. 3A (such as a tap operation on the camera application 215), and enable the camera application in response to the operation.

S102: The electronic device 100 displays a preview interface, and an image captured by the camera in real time are displayed on the preview interface. An image parameter displayed on the preview interface is a first parameter.

Specifically, the preview interface may include a preview box, a shooting mode list, a gallery shortcut key, a shooting control, and the like. The preview box is used to display an image captured by the camera in real time or an image adjusted by the electronic device, and the shooting mode list includes a plurality of shooting modes that can be selected by the user, for example, a photographing mode, a video mode, a movie mode, and a professional mode. The gallery shortcut key may be used to trigger to enter a gallery application, and the shooting control may be used to trigger photographing or video recording. In addition, when the shooting mode is selected, the preview interface displayed by the electronic device 100 is a corresponding user interface in the shooting mode.

Image parameters may refer to parameter values of an image, including size, resolution, color, luminance, hue, saturation, and the like. In this embodiment of this application, an image parameter may be a color parameter, and the first parameter is a color value of the image captured by the camera.

In some embodiments, the first parameter may be an initial parameter value of the image captured by the camera.

In some other embodiments, the first parameter may be a parameter value that is of the image captured by the camera and that is adjusted by the electronic device 100. In this case, an adjustment of the electronic device 100 may refer to an adjustment performed, by the electronic device 100, on shooting parameters such as luminance and focus during shooting based on an adjustment algorithm that is enabled by default.

In the embodiment of this application, the preview interface may be the user interface 31 in the embodiment described in FIG. 3B. Alternatively, the preview interface may be the user interface 31 in the embodiment shown in FIG. 3D, and a first preview box may be the preview box 311 in the embodiment shown in FIG. 3D. In this case, the preview interface may be a user interface displayed by the electronic device 100 when shooting in the movie mode is enabled by default and after the electronic device 100 enables the camera application. In addition, the preview interface may include a plurality of shooting function options. For example, the shooting function option may refer to the shooting mode list 312 shown in FIG. 3C. The electronic device 100 may enter the movie mode after receiving an operation performed by the user on a movie mode option 312D.

The movie mode is a shooting mode of the electronic device 100. In the movie mode, the user can experience a fun of shooting a movie. For specific description of the movie mode and related interfaces, refer to the foregoing related content of FIG. 3A to FIG. 3G, FIG. 4A to FIG. 4E, and FIG. 5A to FIG. 5G.

Then, to enable a shooting process of the electronic device 100 to have an effect of shooting a movie, the preview interface displayed by the electronic device 100 has the following characteristics:

(1) An icon is in a landscape display state.

In the movie mode, icons (such as the gallery shortcut key 313, the camera flip control 315, the movie shutter control 316, and the function option 317 shown in FIG. 3D) included on the preview interface are in the landscape display state, regardless of a specific shooting state (landscape or portrait) of the electronic device 100. In this way, when the electronic device 100 enters the movie mode, a display direction of the icon can guide the user to shoot in a landscape orientation.

(2) A black edge is added.

In the movie mode, the electronic device 100 may cut a size of the image captured by the camera and add black edges at the upper and lower or left and right boundaries of the first preview box, so that an aspect ratio of the image captured by the camera displayed on the preview interface may be an aspect ratio of a movie picture. For example, referring to FIG. 3D, when the aspect ratio of the preview frame 311 is 16:9 and an aspect ratio of a general movie picture is 21:9, the electronic device 100 may add a lateral black edge at the upper and lower boundaries of the preview box 311 shown in FIG. 3D, so that an aspect ratio of a picture captured by the camera displayed in the preview box 311 is 21:9. In this way, in a process in which the user previews, photographs or records a video, the black edge in the preview box and a same aspect ratio as the movie picture can create an atmosphere of shooting or viewing the movie for the user.

In some embodiments, the preview interface may alternatively be the user interface 31 in the embodiment shown in FIG. 6B. In this case, the preview interface may be a user interface displayed by the electronic device 100 when the electronic device 100 enables the professional mode to shoot.

The professional mode is another shooting mode of the electronic device 100. In the professional mode, the electronic device 100 can obtain an image or a video with higher clarity, richer details and content. For specific description of the professional mode and related interfaces, refer to the foregoing related content of FIG. 6A to FIG. 6D, and FIG. 7A to FIG. 7H.

Phase 2 (S103 to S105): The preview image adds an LUT template.

S103: The electronic device 100 detects a first operation for the preview interface.

Specifically, the first operation may be an operation performed by the user to enable an LUT function, the LUT function includes one or more LUT templates, and these LUT templates may be used to change a display effect of an image displayed on the preview interface. In addition, in the movie mode, the preview interface may include a function option 317, and the function option 317 includes an LUT option 317C. After receiving an operation performed by the user on the LUT option 317C, the electronic device 100 enables the LUT function. In the embodiment of this application, the function option 317 may alternatively be a shooting function option.

In some embodiments, the first operation may include the touch operation for the movie mode option 312D in the embodiment shown in FIG. 3B and the touch operation for the LUT option 317C in the embodiment shown in FIG. 3D. In other words, the first operation includes an operation performed by the user to switch the shooting mode and an operation performed by the user to enable the LUT function.

In some embodiments, the first operation may be the touch operation for the LUT option 317C in the embodiment shown in FIG. 3D. Alternatively, the first operation may be the touch operation for the LUT option 317C in the embodiment shown in FIG. 6B.

S104: The electronic device 100 determines a first template, and the first template is used to adjust the first parameter to be a second parameter.

The electronic device 100 may include a plurality of LUT templates, and the first template may be one of the plurality of LUT templates. Some LUT templates may be preset in the electronic device 100, and the electronic device 100 may update the LUT template or download the LUT template online from a server after the electronic device 100 detects an operation performed by the user to enable the LUT function. In the embodiment of this application, the first template may alternatively be a target LUT template.

Because the electronic device 100 can adjust a display effect of the image displayed on the preview interface to be a display effect of the movie picture based on the first template, the first template describes a conversion relationship from a first video to a second video. Because a display effect of the second video is also obtained after the image parameters (such as exposure, saturation, and luminance) of the first video is adjusted. The first video and the second video are respectively an unadjusted display effect video and an adjusted display effect video that are shot based on a movie shooting technique. The first video is a video shot when the movie is shot based on default device parameters, and the second video is a video after the movie display effect is adjusted. The first template can be obtained by extracting a mapping relationship from a color value of the first video to a color value of the second video, and then the first template is applied to the adjustment of the display image on the preview interface, so that a color parameter of the image is changed and a display effect of the image is adjusted. For example, when the first template can adjust the display effect of the image to be a display effect of the "movie A", and the first template describes a conversion relationship from an original film of the "movie A" to a finished film. When the first template is applied to the preview interface to display the image, the first template can adjust the image displayed on the preview interface based on the conversion relationship, to obtain the image whose display effect is adjusted.

Specifically, a color parameter of the first video is the second parameter, a color parameter of the second video is a third parameter, and the first template describes a mapping relationship from the second parameter to the third parameter.

The electronic device may include the following two manners to determine the first template.

(1) The electronic device 100 autonomously determines the LUT template based on the image displayed on the preview interface.

The image displayed on the preview interface may be one or more frames of images displayed on the preview interface when the electronic device 100 detects the first operation for the preview interface.

The LUT template may be used to adjust the color value of the image. Different LUT templates can bring different display effects to the image displayed on the preview interface. For specific description of the LUT template, refer to the related description in FIG. 3E.

In some embodiments, the electronic device 100 may select the first template from the plurality of templates based on image parameters (such as luminance and saturation) of the image and picture content of the image. In other words, the electronic device 100 may recommends a suitable LUT template based on the image displayed on the preview interface intelligently.

Specifically, a process in which an electronic device 100 intelligently recommends a template can be divided into the following four steps.

Step 1: The electronic device 100 determines a shooting scenario of the image.

The electronics 100 may determine the shooting scenario based on the picture content of the image. The picture content of the image may include characters, animals, food, scenery, buildings, indoor, outdoor, and the like. For example, when the electronic device 100 recognizes that the image includes a character, the electronic device 100 determines that the shooting scenario of the image is a portrait scenario.

Specifically, the electronic device 100 may recognize the picture content in the image by using an AI recognition algorithm.

Step 2: The electronic device 100 determines a luminance level of the image.

The luminance of the image is a brightness degree of the image, and a numerical value thereof ranges from 0 to 255. A smaller value indicates lower luminance, and a larger value indicates higher luminance. The electronic device 100 may divide a luminance value into a plurality of luminance levels. For example, the electronic device 100 may be divided into five levels based on a luminance value of the image: highlights, brights, midtones, shadows, and black. A luminance value corresponding to the highlights may be from 225 to 255, a luminance value corresponding to the brights may be from 169 to 225, a luminance value corresponding to the midtones may be from 94 to 169, a luminance value corresponding to the shadows may be from 33 to 94, and a luminance value corresponding to the black may be from 0 to 33. Specifically, the electronic device 100 may determine the luminance level of the image based on the luminance value of the image.

Step 3: The electronic device 100 determines a saturation level of the image.

The saturation of the image refers to vibrance of a color of the image. A larger quantity of colors of the image indicates a higher saturation. The electronic device 100 may divide the saturation of the image into a plurality of saturation levels, for example, the saturation may be divided into three levels: high saturation, medium saturation, and low saturation. A saturation value corresponding to the high saturation is from 67 to 100, a saturation value corresponding to the medium saturation is from 34 to 66, and a saturation value corresponding to the low saturation is from 0 to 33. Specifically, the electronic device 100 may determine the saturation level of the image based on the saturation of the image.

Step 4: The electronic device 100 determines the LUT template based on a template comparison table.

The template comparison table can indicate a corresponding LUT template under different shooting scenarios, different luminance levels, and different saturation levels. Table 1 shows an example of some content in the template comparison table.

TABLE 1

| Shooting scenario | Luminance level | Saturation level | LUT Template |
|---|---|---|---|
| Portrait scenario | Highlights | High saturation | Crisp (Movie A) |
| | Brights | Low saturation | Fresh (Movie B) |
| Landscape scenario | Midtones | High saturation | Gorgeous (Movie C) |
| | | Saturation medium | Elegant (Movie D) |
| | | Low saturation | Black and white (Movie E) |
| Animal scenario | Shadows | High saturation | Intense (Movie F) |
| | Black | Low saturation | Mystery (Movie G) |

The following illustrates a principle of Table 1 in the recommendation template by using a specific example. If the electronic device 100 recognizes that an element such as a sun or a sun halo or a sky exists in the picture based on the image, the electronic device 100 determines that the shooting scenario is a landscape scene; and then if the electronic device 100 determines that the luminance level of the image is midtones and the saturation is high based on the luminance and saturation of the image, the electronic device 100 determines that the LUT template corresponding to the image is "Gorgeous", and the movie corresponding to the template is "Movie C". When the electronic device 100 adjusts the display effect of the image by using the LUT template, the LUT template can make an overall tone of the image light orange, to highlight an atmosphere of a scene in daylight.

It may be understood that the process in which the electronic device 100 intelligently recommends the template is merely an example for description, and there may be another recommending process in the embodiment of this application. For example, after recognizing the picture content of the image in Step 1, the electronic device 100 may further determine a proportion of the picture content in the image, and the template comparison table may further include a corresponding relationship between the template and an influence factor, that is, different proportions of the picture content. In other words, when the proportion of the picture content in the image is different, the LUT template finally determined by the electronic device 100 may be different.

In the embodiment of this application, for the process in which the electronic device 100 intelligently recommends the LUT template, reference may be made to the user interfaces shown in FIG. 3D and FIG. 3E.

(2) The electronic device 100 determine the LUT template based on the user's operation.

Specifically, the electronic device 100 may display one or more LUT template options on the preview interface, the one or more LUT template options may receive a selection operation (such as a tap operation) performed by the user, and in response to the operation, the electronic device 100 determines an LUT template corresponding to the selected LUT template option.

For example, the user's operation may be a tap operation performed on one of the LUT templates in the LUT preview window 319 in the embodiment shown in FIG. 3F. In the embodiment of this application, the user's operation may alternatively be a third operation.

In some embodiments, in a process in which the electronic device 100 determines the LUT template based on a user's operation, or after the electronic device 100 autonomously determines the LUT template based on an image displayed on the preview interface, the electronic device 100 may display a shooting option interface on the preview interface, and the shooting option interface may be used to display one or more LUT template options provided by the LUT function. Further, the shooting option interface includes an LUT template option corresponding to the first template.

For example, the shooting option interface may refer to the LUT preview window 319 in the embodiment shown in FIG. 3F. The LUT template option corresponding to the first template may be a second LUT template option 319C in the embodiment shown in FIG. 3F. Alternatively, the shooting option interface may be the LUT preview window 322 in the embodiment shown in FIG. 6D, and the LUT template option corresponding to the first template may be the first LUT template 322A in the embodiment shown in FIG. 6D.

In some embodiments, when the electronic device 100 displays the shooting option interface and the LUT template option corresponding to the first template is displayed in the shooting option interface, the electronic device 100 may receive an operation performed by the user on the LUT template. In response to the operation, the electronic device 100 displays video content corresponding to the first template, and a display effect of the video content is the same as a display effect of the image that is displayed on the preview interface and that is adjusted by the electronic device 100 based on the first template. For example, the user's operation may be the touch operation performed on the playback control 3191C in the embodiment shown in FIG. 3F, and the video content may be the video displayed in the template display window 320 in the embodiment shown in FIG. 3G.

In other words, the electronic device 100 may display the LUT template as a video, and the user can more clearly and intuitively understand the adjustment effect of the LUT template on the image tone by watching the video. In addition, the video may be a movie clip in the movie corresponding to the LUT template, to make a preview process of the LUT template more interesting and enhance association between the movie mode and the movie.

It may be understood that the electronic device 100 may include the foregoing two manners of determining the LUT template. For example, after autonomously determining the LUT template based on the image displayed on the preview interface, the electronic device 100 may receive a selection operation performed by the user on the LUT template option in the shooting option interface, to change the LUT template determined by the electronic device 100. Alternatively, after determining the LUT template based on the user's operation, the electronic device 100 may receive an operation performed by the user to enable the electronic device 100 to autonomously determine the LUT template, and in response to the operation, the electronic device 100 may autonomously determine the LUT template based on the image displayed on the preview interface.

In some embodiments, the electronic device 100 may display an LUT intelligent recommendation control (such as the intelligent identification control 319A shown in FIG. 3F), the LUT intelligent recommendation control may be used to enable or disable the function in which the electronic device 100 intelligently recommends the LUT template, and the user can select the manner in which the electronic device 100 determines the LUT template by using the control. Specifically, when the intelligent LUT recommendation control is enabled, and after the electronic device 100 enables the LUT function, an LUT may be determined to change the display effect of the image on the preview interface, and then one or more LUT template options are displayed for the user to select; and when the intelligent LUT recommendation control is disabled, and after the electronic device 100 enables the LUT function, one or more LUT template options and the intelligent recommendation control are directly displayed for the user to select.

S105: The electronic device 100 adjusts the display effect of the display image on the preview interface based on the first template, and an adjusted image parameter of the display image is a fourth parameter.

The display effect may be a display effect of the image after hue, luminance, saturation, and the like are adjusted. A mapping relationship from the first parameter to the fourth parameter is the same as the mapping relationship from the second parameter to the third parameter.

In this case, the adjusted display image may be the image displayed in the preview box 311 in the embodiment shown in FIG. 3E. Alternatively, the adjusted display image may be the image displayed in the preview box 311 in the embodiment shown in FIG. 6D.

When the image parameter is the color value, the first parameter and the fourth parameter are different color values. It should be noted that the first parameter and the fourth parameter each may include a plurality of color values. Each color value in the first parameter can correspond to a unique color value in the fourth parameter.

In some embodiments, after adjusting the display effect of the display image on the preview interface based on the first template, the electronic device 100 may display prompt information on the preview interface, to prompt the user that the display of the image has been adjusted. For example, referring to FIG. 3E, the prompt information may be the prompt information 318.

Phase 3 (S106): Trigger photographing and save a picture, or trigger video recording and save a video.

S106: The electronic device 100 detects a second operation for the preview interface and saves the image displayed on the preview interface as a picture or a video.

Specifically, the shooting control on the preview interface may be a first photographing control, and the second operation may be an operation performed by the user on the first photographing control. In response to the operation, the electronic device 100 may save the image displayed on the preview interface as an image. Alternatively, the shooting control on the preview interface may be a recording control, and the second operation may include an operation performed by the user on the recording control. In response to the operation, the electronic device 100 starts video recording, the recording control may be updated to be an end recording control. Then the second operation further includes an operation performed by the user on the end recording control. In response to the operation, the electronic device 100 ends video recording, and saves an image displayed on the preview interface between starting video recording and ending video recording as a video. Alternatively, in a recording process of the electronic device 100, the preview interface may include a second photographing control in addition to the end recording control. The second operation may be an operation performed by the user on the second photographing control, and in response to the operation, the electronic device 100 saves the image displayed on the preview interface as an image during video recording.

For example, the second operation may be an operation performed by the user on the movie shutter control 316 in the embodiment shown in FIG. 3H. Alternatively, the second operation may be an operation performed by the user on the recording control 321 in the embodiment shown in FIG. 6D.

In other words, the electronic device 100 may save the image to which the LUT template is added as an image or a video during shooting. In this way, the user can not only adjust the display effect of the preview image in the preview process, but also save the preview image whose display effect is adjusted as a picture or a video, so that the color of the picture or the picture content corresponding to the video obtained by the user becomes richer, and useful information in the picture is highlighted. Further, the LUT template is related to a movie, and different LUT templates correspond to different movie tones. Specifically, an LUT template adjusts the image display effect, to enable a display effect of the adjusted image, such as hue, luminance and saturation, to be close to or the same as a display effect of a specific movie, such as hue, luminance and saturation, so that the user can take a picture or video with a movie tone.

It may be understood that in the UI embodiment of this application, the movie mode and the professional mode each show an example of the shooting control for video recording, and the shooting control may be used to save the image displayed on the preview interface as a video. In another embodiment of this application, the movie mode and the professional mode may further include a shooting control for photographing, and the shooting control may be used to save the image displayed on the preview interface as an image. This is not limited in embodiments of this application.

In some embodiments, in professional mode, the electronic device 100 also provides a LOG function, and the LOG function may be used to adjust exposure of the image captured by the camera, so that the image finally displayed by the electronic device 100 has low saturation. Referring to FIG. 7A to FIG. 7C, the electronic device 100 may receive an operation performed by the user on the LOG option 317E shown in FIG. 7A, and in response to the operation, enable the LOG function. It can be seen from the image displayed in the preview box 311 shown in FIG. 7B that an overall tone of the image is gray. The electronic device 100 starts recording the video when the electronic device 100 receives the touch operation performed on the recording control 321 shown in FIG. 7B, and the electronic device 100 ends recording the video when the electronic device 100 receives the touch operation performed on the end recording control 323 shown in FIG. 7C, so as to obtain a video (hereinafter referred to as a "gray film") with a gray overall tone of the picture content.

In some embodiments, after the electronic device 100 obtains the gray film by using the LOG function in the professional mode, the gray film may be stored in the gallery application. The electronic device 100 may also use the LUT template to change the tone of the gray film in the gallery application, to restore the gray tone of the video to be a colorful tone. Different from that the electronic device 100 uses the LUT template before video recording or photographing, the electronic device 100 uses the LUT template to adjust the display effect of the image after obtaining the gray film, so that flexibility and freedom of the user in adjusting the image display effect are enhanced.

In some embodiments, in the movie mode, the electronic device 100 may also include a movie recording animation effect. The electronic device 100 may provide a time-lapse shooting function. Referring to the user interface shown in FIG. 5A, the electronic device 100 may receive a touch operation performed on a setting option 317D, and in response to the operation, the electronic device 100 enters a shooting setting interface, and the user can adjust a time-lapse shooting time by using a time adjustment option 413A on the interface. Specifically, the electronic device may receive a sixth operation performed on the time adjustment option 413A, and in response to the sixth operation, adjust the time-lapse shooting time, and set a preset duration. For example, the time-lapse shooting time set by the electronic device 100 is three seconds, and when the electronic device 100 receives a touch operation performed by the user on the movie shutter control 316, in response to the operation, the electronic device 100 displays the countdown information on the user interface shown in FIG. 5D, FIG. 5E, and FIG. 5F, so as to present a movie recording animation effect to the user. In this way, the shooting can be more interesting, and a movie shooting style in the movie mode can be highlighted.

Embodiments of this application may be arbitrarily combined to achieve different technical effects.

All or some of the foregoing embodiments may be implemented by software, hardware, firmware, or any combination thereof. When software is used to implement embodiments, embodiments may be implemented completely or partially in a form of a computer program product. The computer program product includes one or more computer program instructions. When the computer program instructions are loaded and executed on a computer, the procedure or functions according to embodiments of this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person of ordinary skill in the art may understand that all or some of the processes of the methods in embodiments may be implemented by a computer program instructing relevant hardware. The program may be stored in a computer-readable storage medium. When the program is run, the processes of the methods in embodiments are performed. The foregoing storage medium includes any medium that can store program code, for example, a ROM, a RAM, a magnetic disk, or an optical disc.

In summary, the above descriptions are merely examples of embodiments of the technical solutions of the present disclosure, but are not intended to limit the protection scope of the present disclosure. Any modification, equivalent replacement, or improvement made without departing from the disclosure of the present disclosure shall fall within the protection scope of the present disclosure.

What is claimed is:

1. A shooting method, comprising:
    displaying, by an electronic device comprising a camera, a preview interface, wherein the preview interface displays a first image from the camera and a plurality of shooting function options, wherein a color parameter of the first image is a first parameter, and wherein the plurality of shooting function options comprise a look-up table (LUT) function option;
    receiving, by the electronic device, a first operation for the LUT function option among the plurality of shooting function options, wherein the LUT function option corresponds to a LUT function, the LUT function provides a plurality of LUT templates, and the plurality of LUT templates are used to change a color parameter of an image;
    displaying, by the electronic device in response to the first operation, a plurality of LUT template options on the preview interface, wherein the plurality of LUT template options comprise a first LUT template option, and wherein the plurality of LUT template options correspond to the plurality of LUT templates, respectively;
    determining, by the electronic device, a target LUT template from the plurality of LUT templates, wherein the target LUT template corresponds to the first LUT template option, wherein the target LUT template describes a mapping relationship between a second parameter and a third parameter, the second parameter is a color parameter corresponding to a first video, and the third parameter is a color parameter corresponding to a second video;
    adjusting, by the electronic device based on the target LUT template, the color parameter of the first image, to obtain a second image;
    displaying, by the electronic device, the second image on the preview interface, wherein a color parameter of the second image is a fourth parameter, and a mapping relationship between the first parameter and the fourth parameter is the same as the mapping relationship between the second parameter and the third parameter; and
    receiving, by the electronic device, a second operation performed on the preview interface, wherein in response to the second operation, the electronic device starts shooting for the second image.

2. The method according to claim 1, wherein the plurality of LUT templates are stored in the electronic device, and wherein determining, by the electronic device, the target LUT template from the plurality of LUT templates comprises:
    determining, by the electronic device based on luminance, saturation, and picture content of the first image, the target LUT template among the plurality of LUT templates.

3. The method according to claim 1, wherein after determining, by the electronic device, the target LUT template from the plurality of LUT templates, the method further comprises:
    displaying, by the electronic device, prompt information, wherein the prompt information is used to indicate that an image displayed on the preview interface has adjusted a color parameter based on the target LUT template.

4. The method according to claim 1, wherein after displaying, by the electronic device in response to the first operation, the plurality of LUT template options, the method further comprises:
    receiving, by the electronic device, a third operation performed on the first LUT template option among the plurality of template options; and
    determining, by the electronic device in response to the third operation, the target LUT template corresponding to the first LUT template option.

5. The method according to claim 4, wherein after displaying, by the electronic device in response to the first operation, the plurality of LUT template options, the method further comprises:

detecting, by the electronic device, a fourth operation performed on the first LUT template option, wherein in response to the fourth operation, the electronic device displays a video display window, and the video display window is used to display the second video.

6. The method according to claim 1, wherein on the preview interface, sizes of the first image and the second image are preset sizes, and an area of the preview interface other than areas of the preview interface for the first image or the second image is displayed in black.

7. The method according to claim 1,
wherein before the receiving, by the electronic device, the first operation for the LUT function option among the plurality of shooting function options, the method further comprises:
displaying, in the preview interface, a plurality of shooting mode options, wherein the plurality of shooting mode options correspond to a plurality of shooting modes, respectively;
wherein displaying, by the electronic device, the preview interface comprises:
displaying, by the electronic device, the first image from the camera, and
displaying, by the electronic device based an operation performed on a first shooting mode option among the plurality of shooting mode options, the plurality of shooting function options in the preview interface.

8. The method according to claim 7, wherein after the electronic device receives the operation performed on the first shooting mode option, the method further comprises:
displaying, by the electronic device in a landscape orientation, the plurality of shooting function options in the preview interface.

9. The method according to claim 1, wherein before the receiving, by the electronic device, the first operation for the LUT function option among the plurality of shooting function options, the method further comprises:
receiving, by the electronic device, a fifth operation performed on a second shooting function option among the plurality of shooting function options, wherein in response to the fifth operation, a frame rate of an image captured by the camera is greater than a first value, and a color depth value is greater than a second value.

10. The method according to claim 1, wherein the method further comprises:
receiving, by the electronic device, a sixth operation performed on the preview interface, wherein the sixth operation is used to set a preset duration; and
saving, by the electronic device, the second image as a picture or a video after the preset duration.

11. The method according to claim 10, wherein before the saving, by the electronic device, the second image as a picture or a video, the method further comprises:
displaying, by the electronic device, countdown information on the preview interface.

12. The method according to claim 1, wherein the first LUT template option is used to trigger the electronic device to display the second video.

13. An electronic device, comprising:
a display;
a camera;
a touch sensor;
a memory storing one or more programs; and
one or more processors, wherein when the one or more processors execute the one or more programs, the electronic device is enabled to implement a method comprising:
displaying a preview interface, wherein the preview interface displays a first image from the camera and a plurality of shooting function options, wherein a color parameter of the first image is a first parameter, and wherein the plurality of shooting function options comprise a look-up table (LUT) function option;
receiving a first operation for the LUT function option among the plurality of shooting function options, wherein the LUT function option corresponds to a LUT function, the LUT function provides a plurality of LUT templates, and the plurality of LUT templates are used to change a color parameter of an image;
displaying, in response to the first operation, a plurality of LUT template options on the preview interface, wherein the plurality of LUT template options comprise a first LUT template option, and wherein the plurality of LUT template options correspond to the plurality of LUT templates, respectively;
determining a target LUT template from the plurality of LUT templates, wherein the target LUT template corresponds to the first LUT template option, wherein the target LUT template describes a mapping relationship between a second parameter and a third parameter, the second parameter is a color parameter corresponding to a first video, and the third parameter is a color parameter corresponding to a second video;
adjusting, based on the target LUT template, the color parameter of the first image, to obtain a second image;
displaying the second image on the preview interface, wherein a color parameter of the second image is a fourth parameter, and a mapping relationship between the first parameter and the fourth parameter is the same as the mapping relationship between the second parameter and the third parameter; and
receiving a second operation performed on the preview interface, wherein in response to the second operation, the electronic device starts shooting for the second image.

14. A non-transitory computer-readable storage medium storing instructions that, when executed on an electronic device that includes a camera, cause the electronic device to perform a method comprising:
displaying a preview interface, wherein the preview interface displays a first image from the camera and a plurality of shooting function options, wherein a color parameter of the first image is a first parameter, and wherein the plurality of shooting function options comprise a look-up table (LUT) function option;
receiving a first operation for the LUT function option among the plurality of shooting function options, wherein the LUT function option corresponds to a LUT function, the LUT function provides a plurality of LUT templates, and the plurality of LUT templates are used to change a color parameter of an image;
displaying, in response to the first operation, a plurality of LUT template options on the preview interface, wherein the plurality of LUT template options comprise a first LUT template option, and wherein the plurality of LUT template options correspond to the plurality of LUT templates, respectively;
determining a target LUT template from the plurality of LUT templates, wherein the target LUT template corresponds to the first LUT template option, wherein the target LUT template describes a mapping relationship between a second parameter and a third parameter, the second parameter is a color parameter corresponding to a first video, and the third parameter is a color parameter corresponding to a second video;

adjusting, based on the target LUT template, the color parameter of the first image, to obtain a second image;

displaying the second image on the preview interface, wherein a color parameter of the second image is a fourth parameter, and a mapping relationship between the first parameter and the fourth parameter is the same as the mapping relationship between the second parameter and the third parameter; and receiving a second operation performed on the preview interface, wherein in response to the second operation, the electronic device starts shooting for the second image.

* * * * *